US010792860B2

(12) United States Patent
Watanabe et al.

(10) Patent No.: US 10,792,860 B2
(45) Date of Patent: Oct. 6, 2020

(54) STEREOLITHOGRAPHIC OBJECT, PRODUCT, AND METHOD OF MANUFACTURING PRODUCT

(71) Applicant: SONY CORPORATION, Tokyo (JP)

(72) Inventors: Tomomasa Watanabe, Kanagawa (JP); Hideki Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 303 days.

(21) Appl. No.: 15/571,889

(22) PCT Filed: Mar. 24, 2016

(86) PCT No.: PCT/JP2016/059340
§ 371 (c)(1),
(2) Date: Nov. 6, 2017

(87) PCT Pub. No.: WO2016/185792
PCT Pub. Date: Nov. 24, 2016

(65) Prior Publication Data
US 2018/0133954 A1    May 17, 2018

(30) Foreign Application Priority Data
May 15, 2015    (JP) .................................. 2015-099922

(51) Int. Cl.
*B29C 64/135*    (2017.01)
*B29C 67/00*    (2017.01)
(Continued)

(52) U.S. Cl.
CPC .......... *B29C 64/135* (2017.08); *A45D 29/007* (2013.01); *A61Q 3/02* (2013.01);
(Continued)

(58) Field of Classification Search
CPC .......... B29C 64/135; B29C 67/00; B32B 7/02; A61Q 3/02; A45D 29/007; B33Y 50/02; B33Y 10/00; B33Y 80/00; B33Y 70/00
(Continued)

(56) References Cited

U.S. PATENT DOCUMENTS

| 6,200,646 B1* | 3/2001 | Neckers ................ B29C 64/129 427/510 |
| 6,316,153 B1 | 11/2001 | Goodman et al. |

(Continued)

FOREIGN PATENT DOCUMENTS

| CA | 2326322 A1 | 10/1999 |
| CN | 105338952 A | 2/2016 |

(Continued)

OTHER PUBLICATIONS

International Search Report and Written Opinion of PCT Application No. PCT/JP2016/059340, dated Apr. 19, 2016, 06 pages of ISRWO.

*Primary Examiner* — Brent T O'Hern
(74) *Attorney, Agent, or Firm* — Chip Law Group

(57) ABSTRACT

A stereolithographic object includes a first curable resin part that is provided at a position suitable for contact with a base member and one or a plurality of second curable resin parts that are provided to be in contact with the first curable resin part and to allow part of a side surface of the first curable resin part to be exposed. The first curable resin part includes resin that has a functional group number and a polymer polymerization degree that are relatively small compared with those of the second curable resin part. The one or the plurality of second curable resin parts includes resin that has a functional group number and a polymer polymerization degree that are relatively great compared with those of the first curable resin part.

7 Claims, 21 Drawing Sheets

(51) Int. Cl.
*B33Y 80/00* (2015.01)
*B33Y 10/00* (2015.01)
*B33Y 70/00* (2020.01)
*B33Y 50/02* (2015.01)
*A45D 29/00* (2006.01)
*A61Q 3/02* (2006.01)
*B32B 7/02* (2019.01)

(52) U.S. Cl.
CPC ............... *B29C 67/00* (2013.01); *B32B 7/02* (2013.01); *B33Y 10/00* (2014.12); *B33Y 50/02* (2014.12); *B33Y 70/00* (2014.12); *B33Y 80/00* (2014.12)

(58) Field of Classification Search
USPC ........................................................ 428/119
See application file for complete search history.

(56) References Cited

U.S. PATENT DOCUMENTS

| | | | |
|---|---|---|---|
| 2001/0024129 A1* | 9/2001 | Akram | G01R 1/0408 324/750.25 |
| 2002/0105080 A1* | 8/2002 | Speakman | B41J 2/01 257/749 |
| 2003/0054173 A1* | 3/2003 | Ruddy | C08G 59/226 428/413 |
| 2005/0258573 A1* | 11/2005 | Minegishi | B29C 35/12 264/449 |

FOREIGN PATENT DOCUMENTS

| | | |
|---|---|---|
| EP | 1084454 A1 | 3/2001 |
| JP | 07-070519 A | 3/1995 |
| JP | 2002-512260 A | 4/2002 |
| JP | 2013-043853 A | 3/2013 |
| JP | 2013-177362 A | 9/2013 |
| JP | 2014-204775 A | 10/2014 |
| JP | 2014204775 A * | 10/2014 |
| WO | 1999/054784 A1 | 10/1999 |
| WO | 2014/199966 A1 | 12/2014 |

* cited by examiner

[FIG. 1]
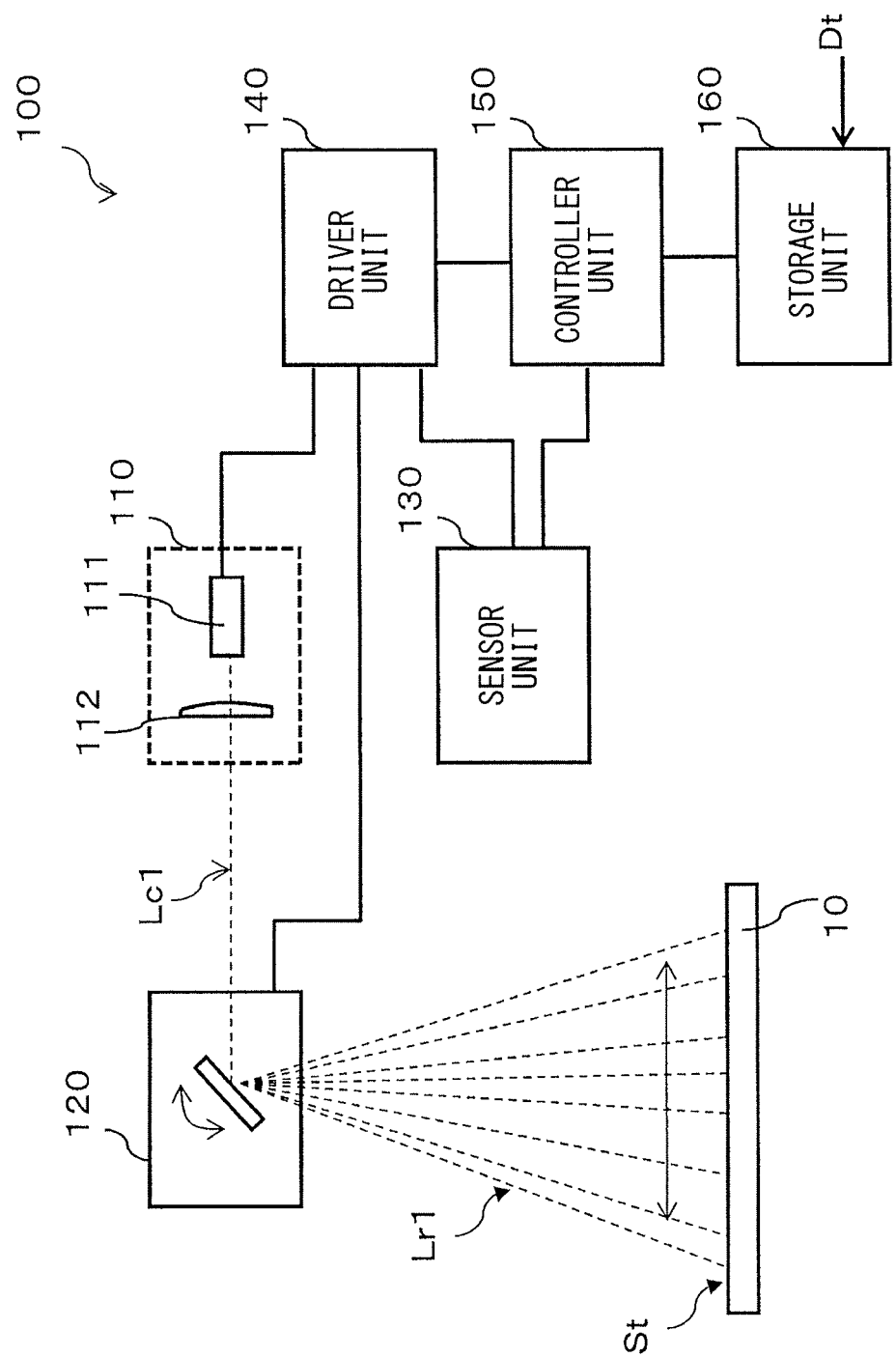

[ FIG. 2A ]
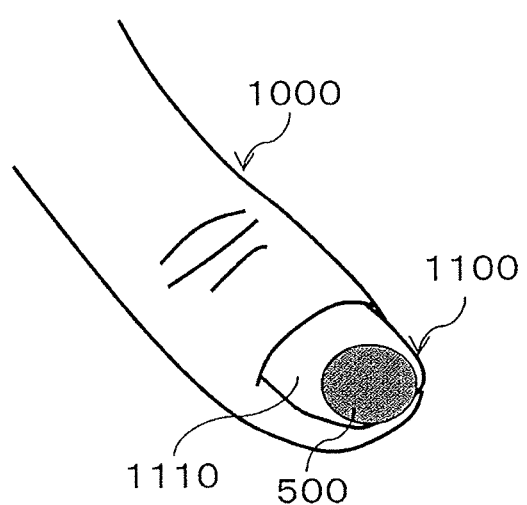
[ FIG. 2B ]
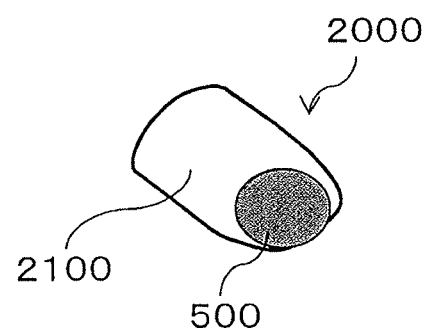

[ FIG. 2C ]
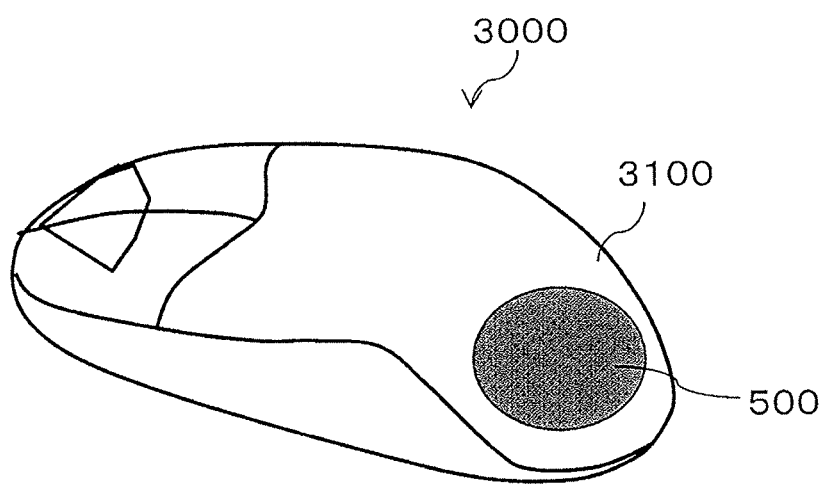
[ FIG. 2D ]
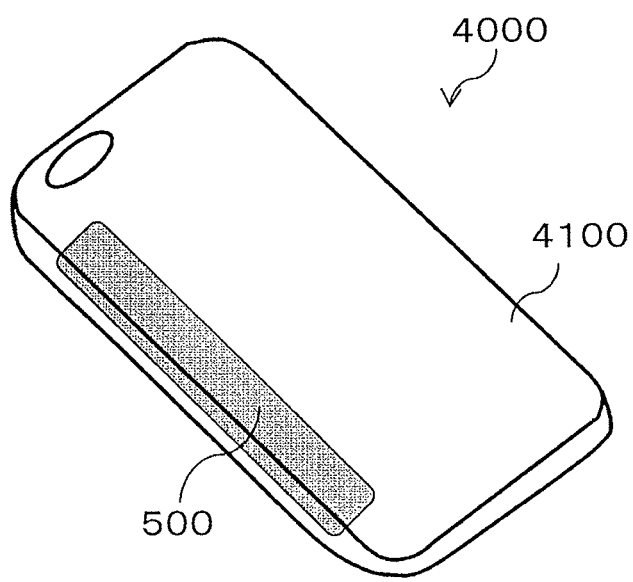

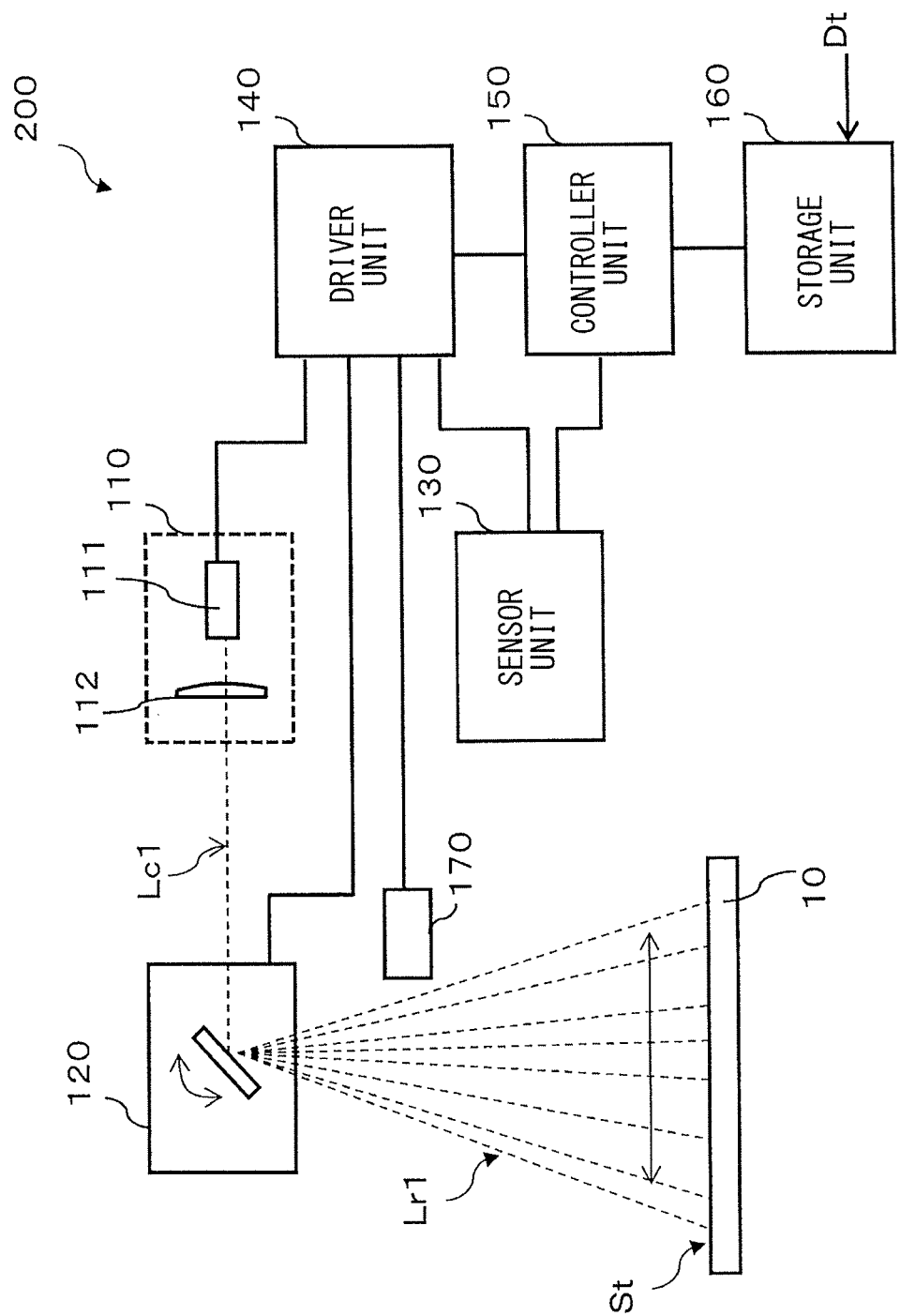
[FIG. 3]

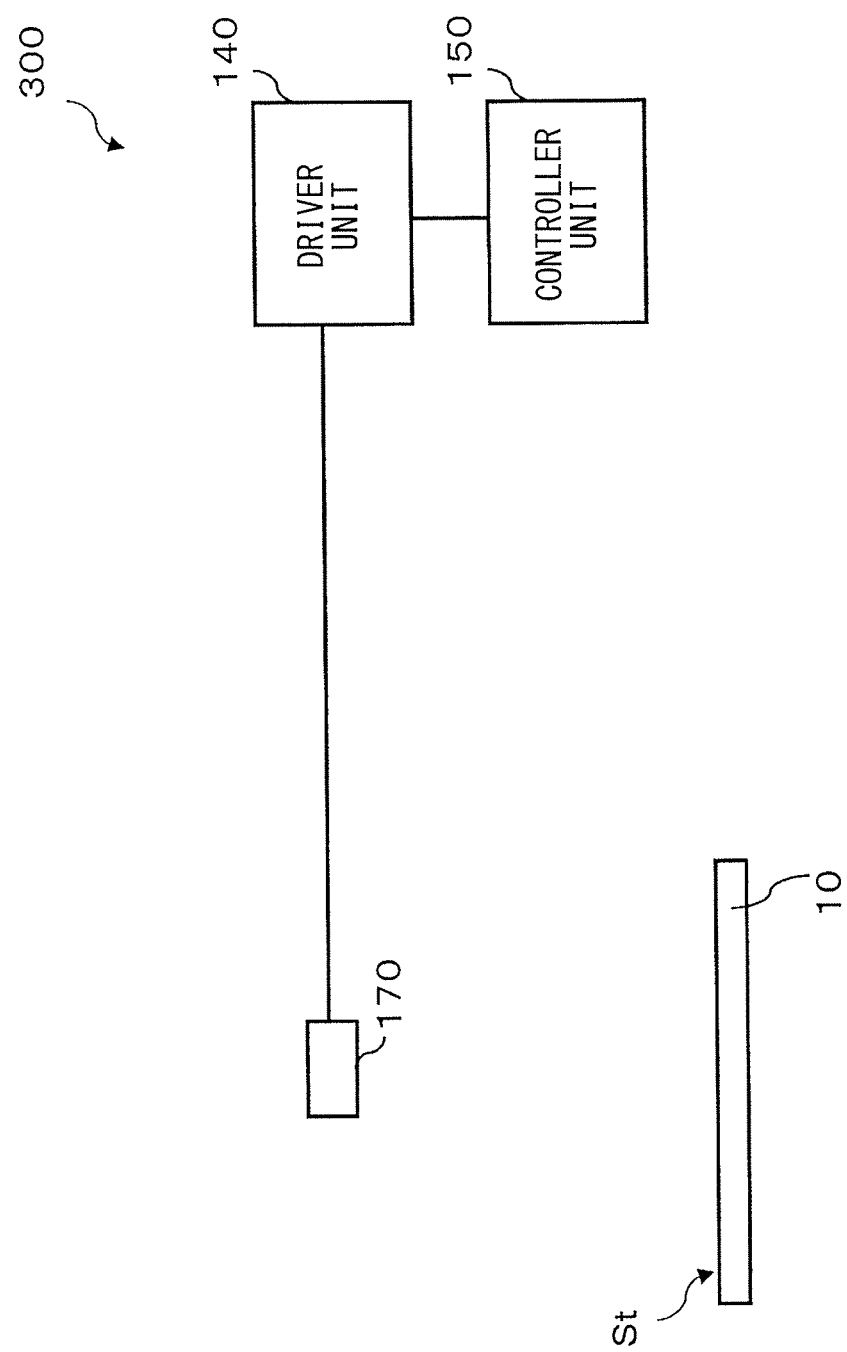

[ FIG. 5 ]
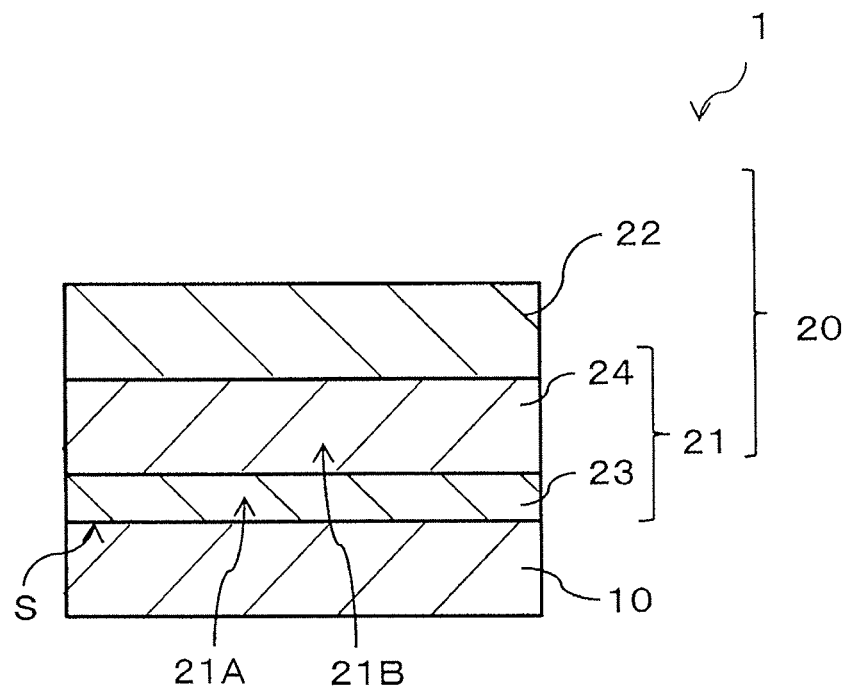
[ FIG. 6 ]
|  | 405nm | 365nm |
|---|---|---|
| RESIN A | ◎ | △ |
| RESIN B | △ | ◎ |

[ FIG. 7A ]
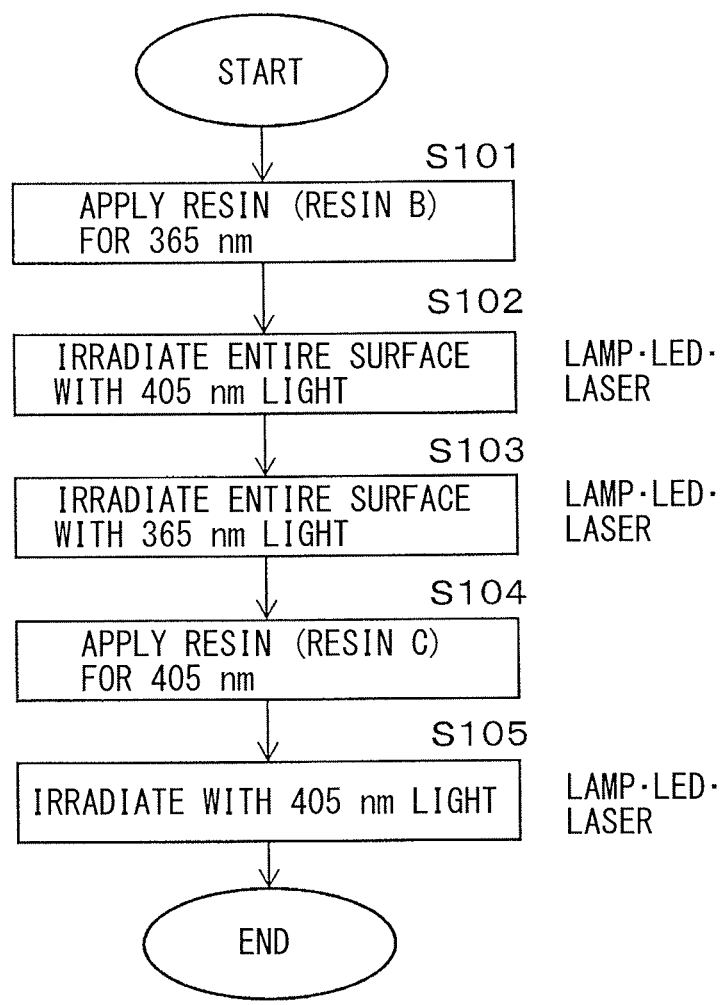

[ FIG. 7B ]
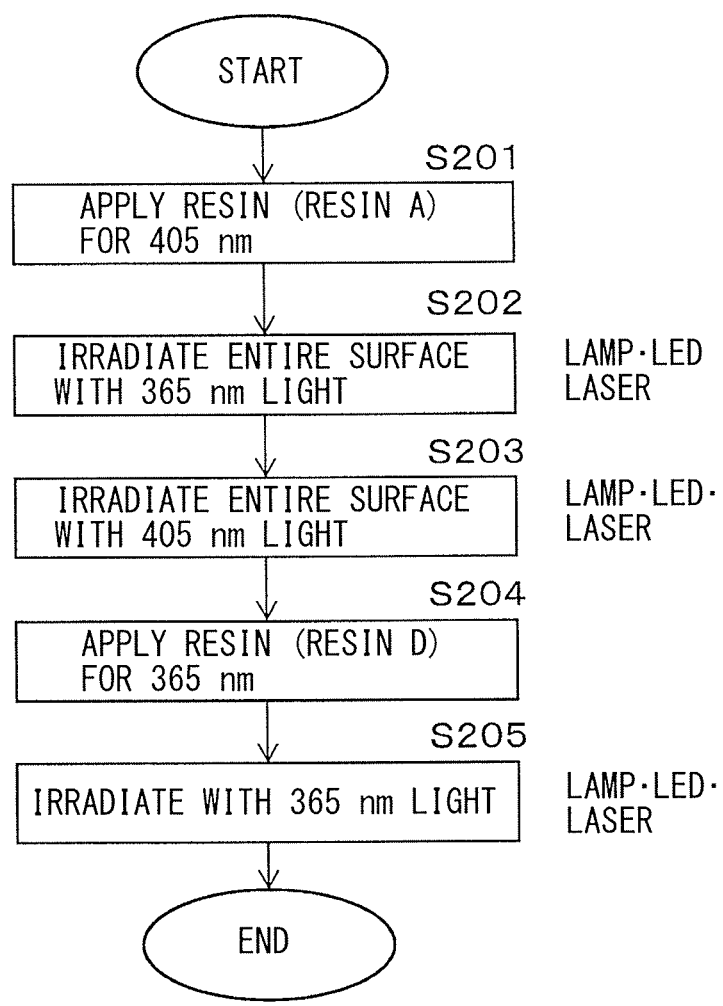

[FIG. 8]
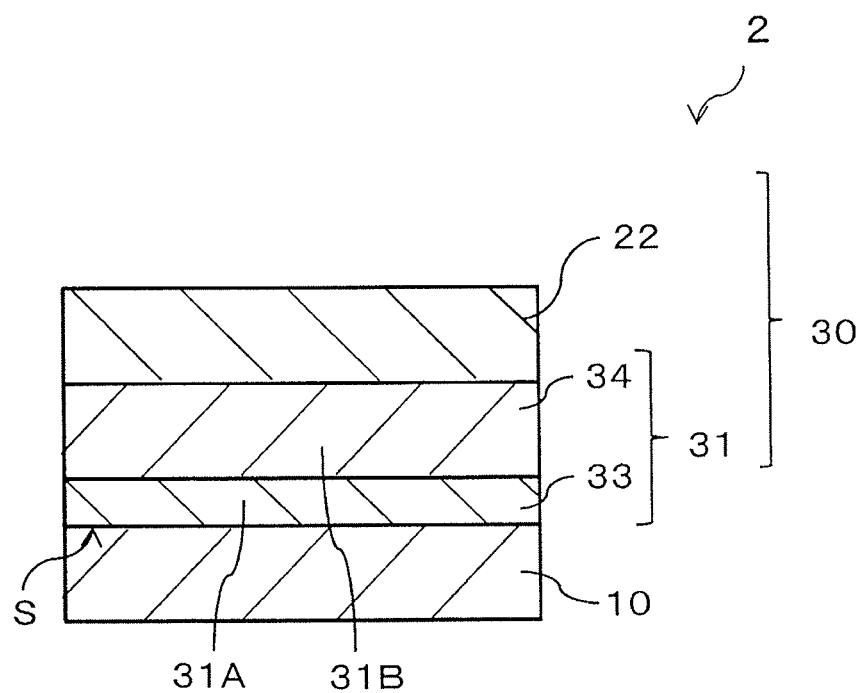

[ FIG. 9A ]
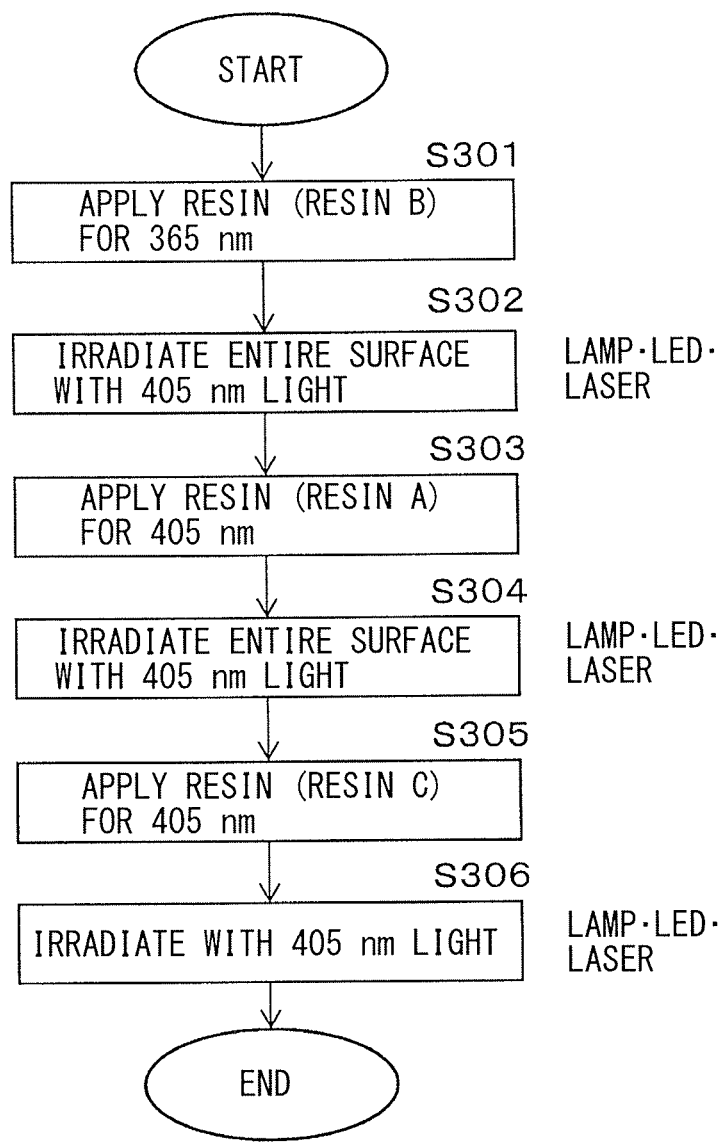

[ FIG.9B ]
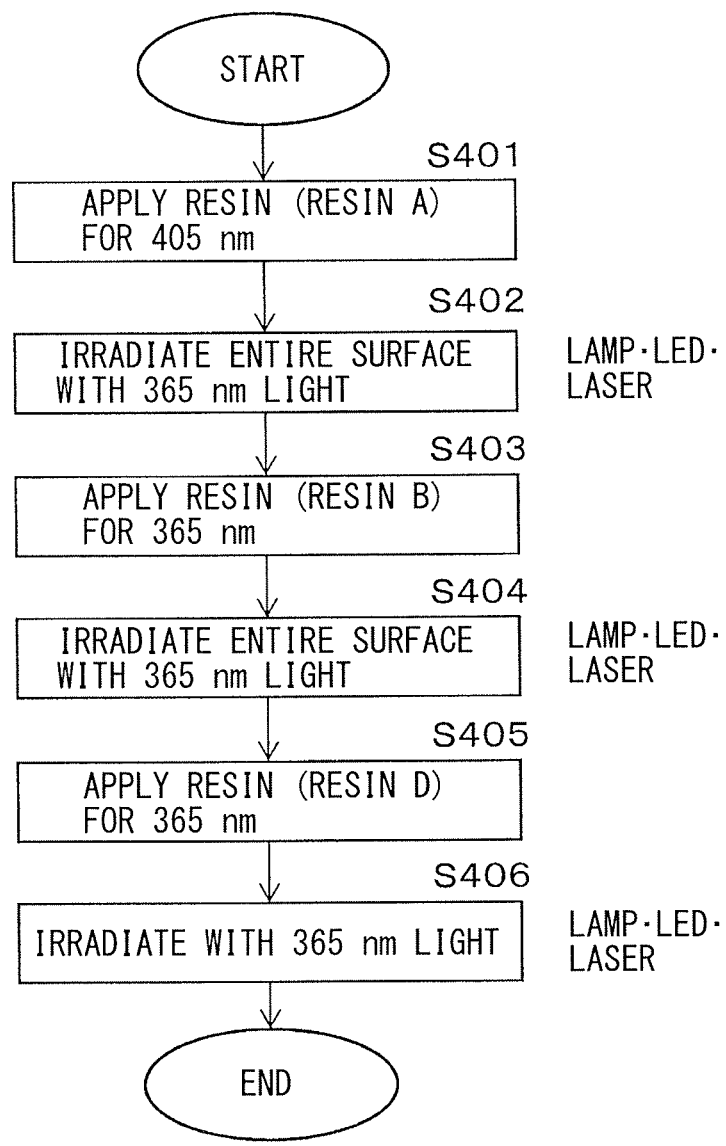

[ FIG. 10A ]
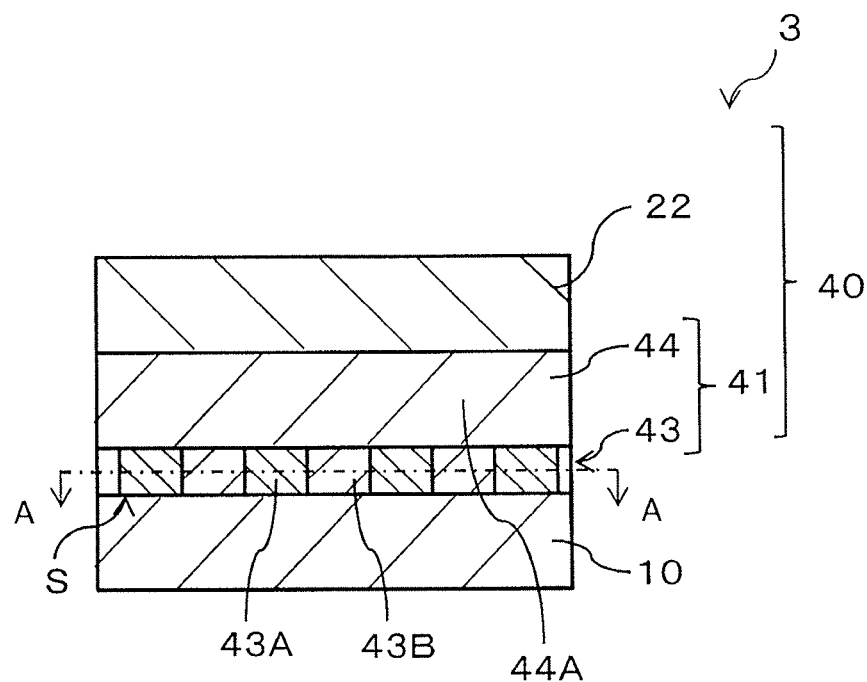
[ FIG. 10B ]
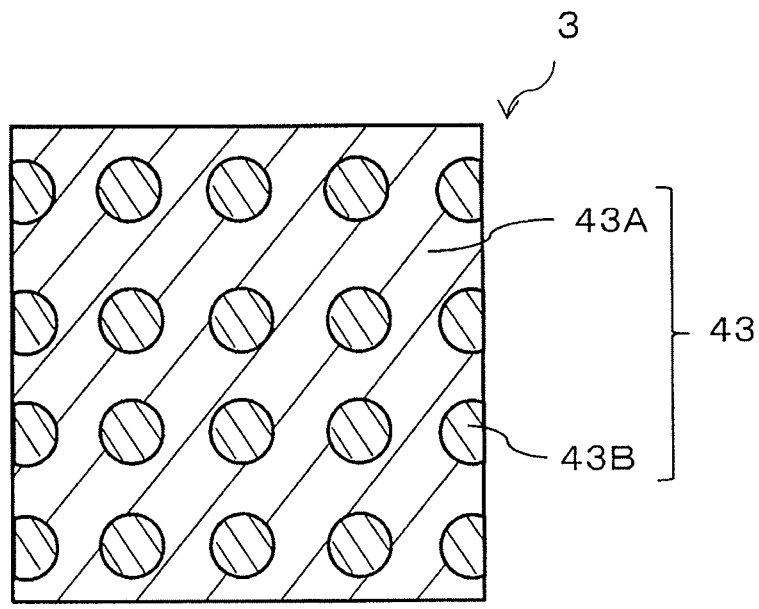

[ FIG. 11A ]
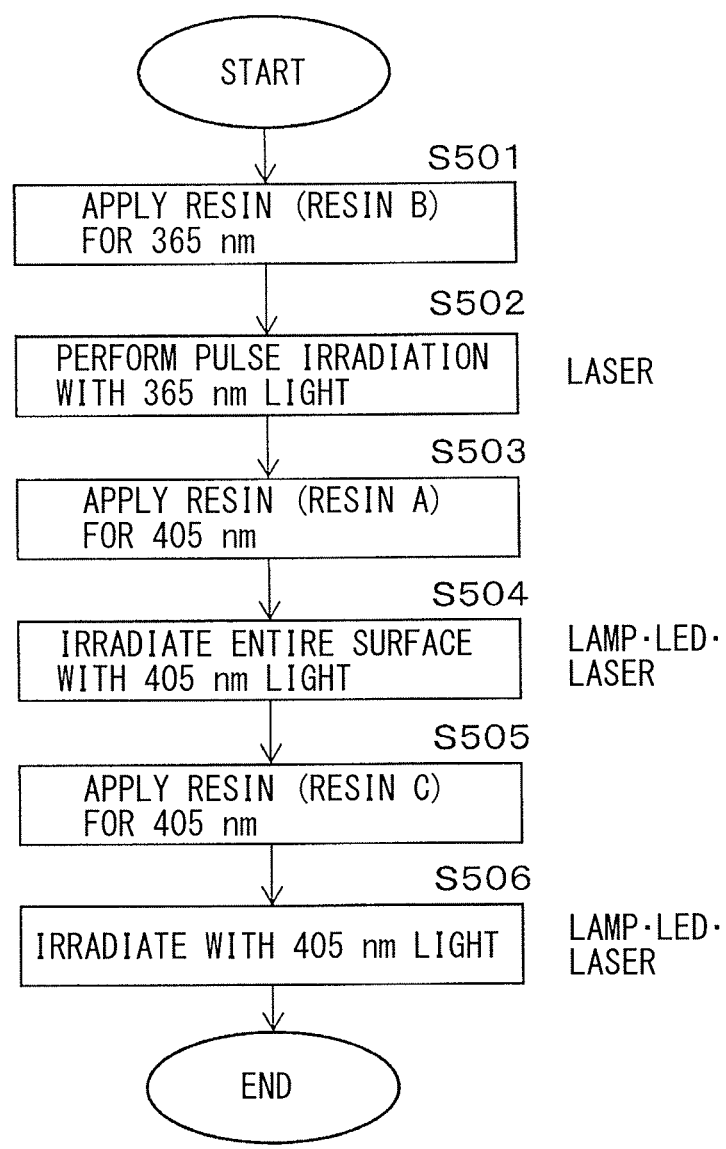

[ FIG. 11B ]
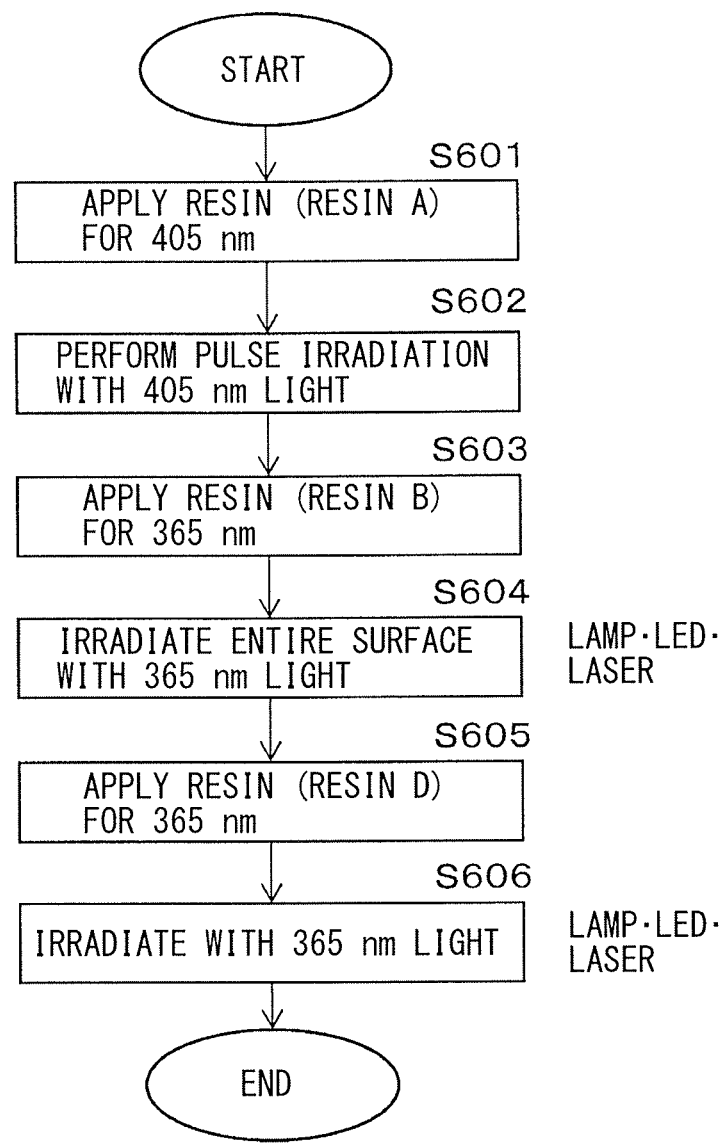

[ FIG. 12A ]
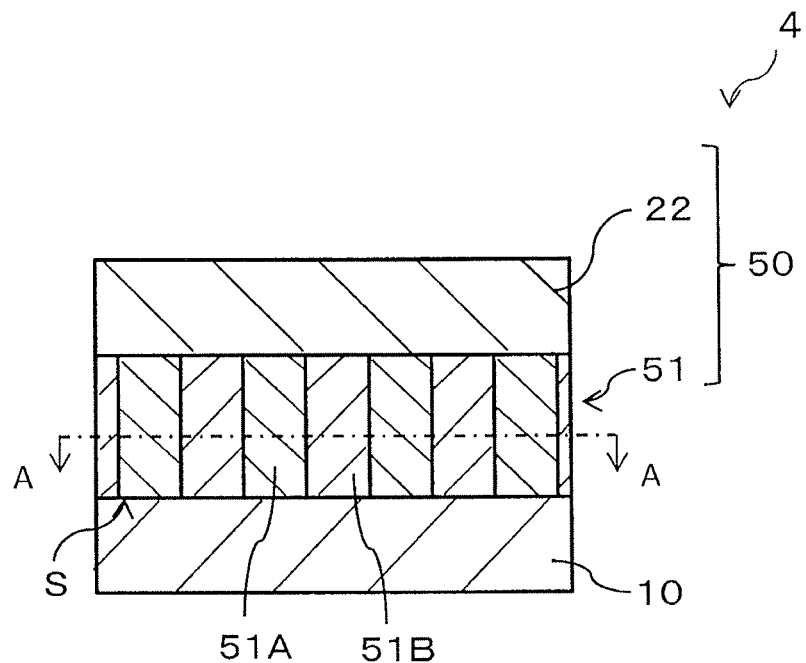
[ FIG. 12B ]
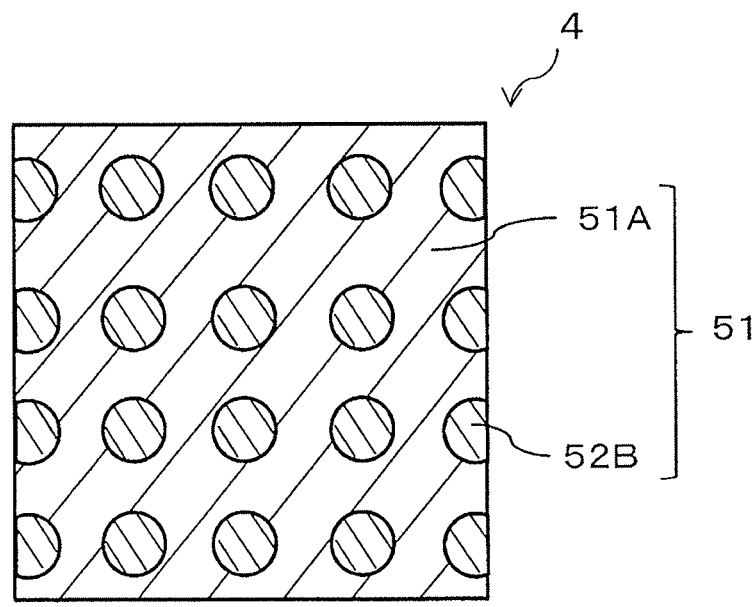

[ FIG. 13 ]
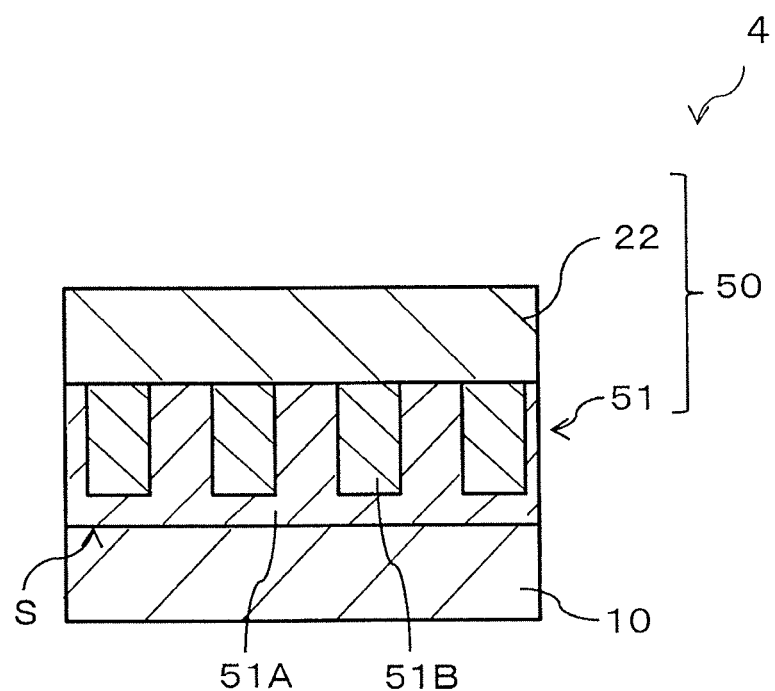

[ FIG. 14A ]
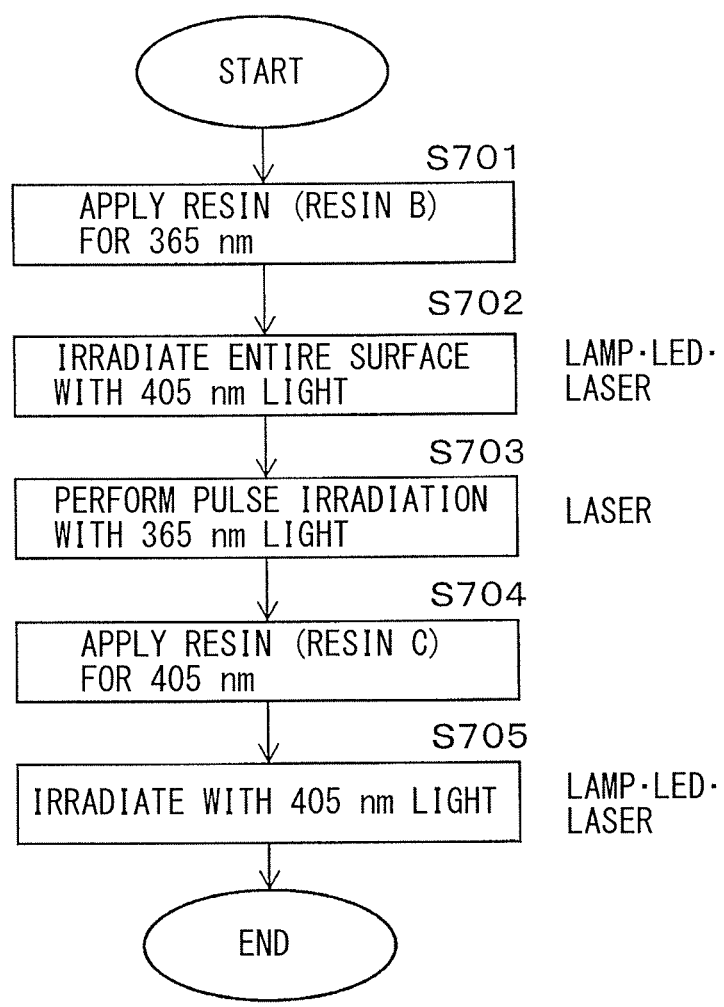

[ FIG. 14B ]
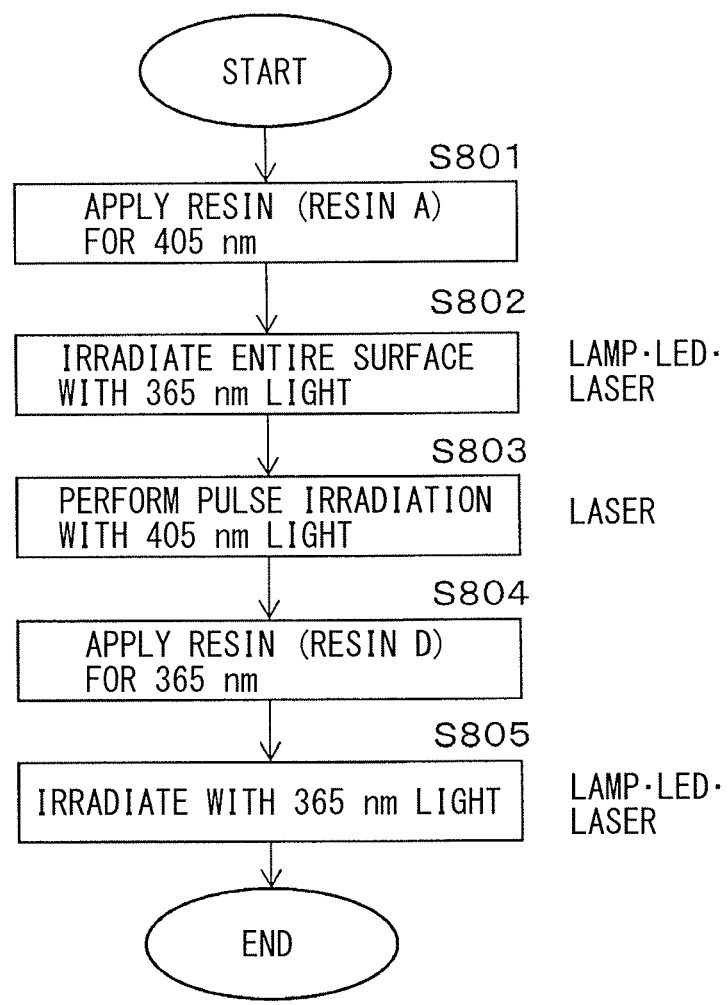

[ FIG. 15A ]
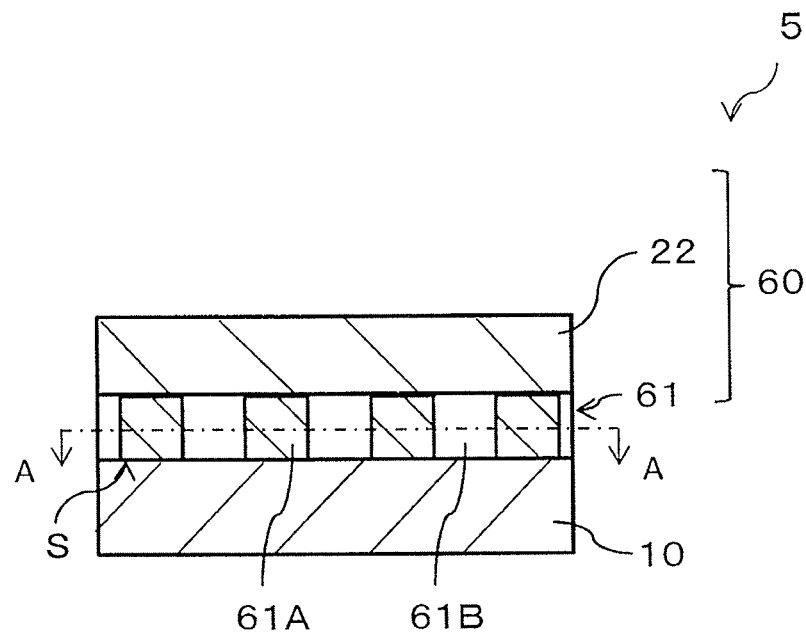
[ FIG. 15B ]
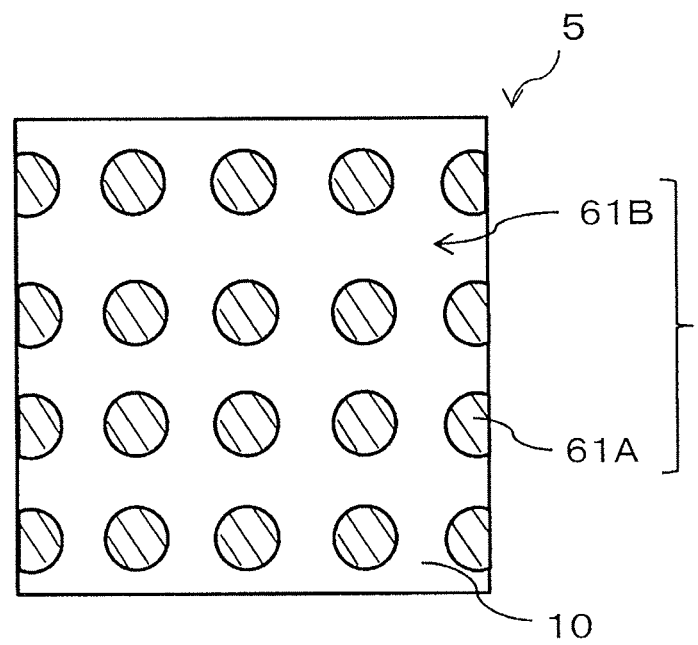

[ FIG. 16 ]
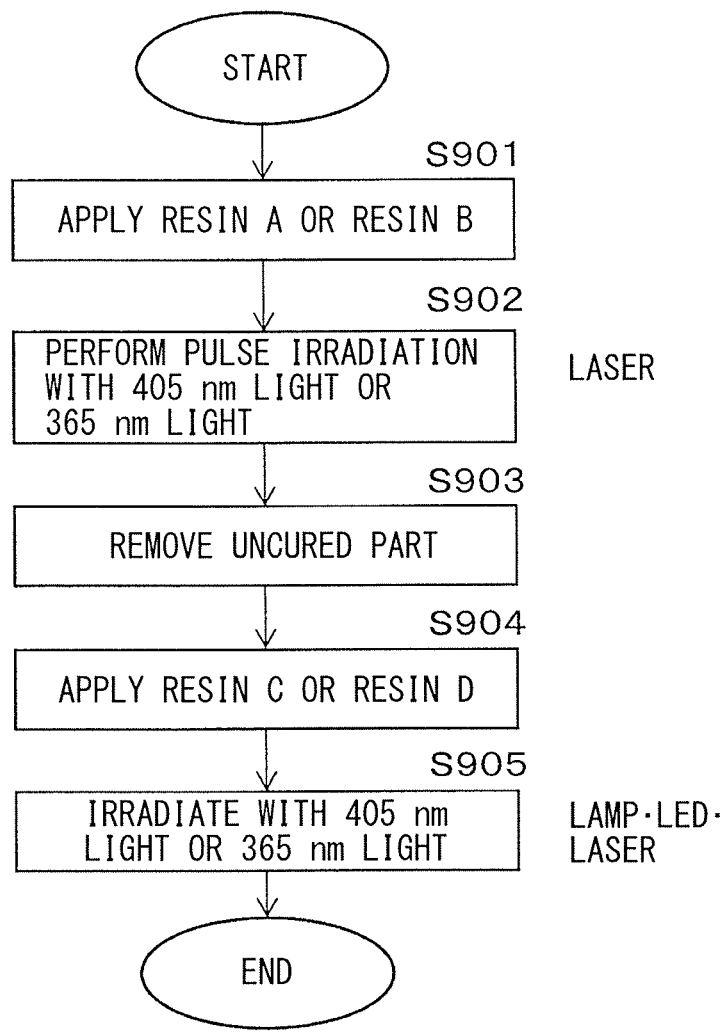

[ FIG. 17 ]
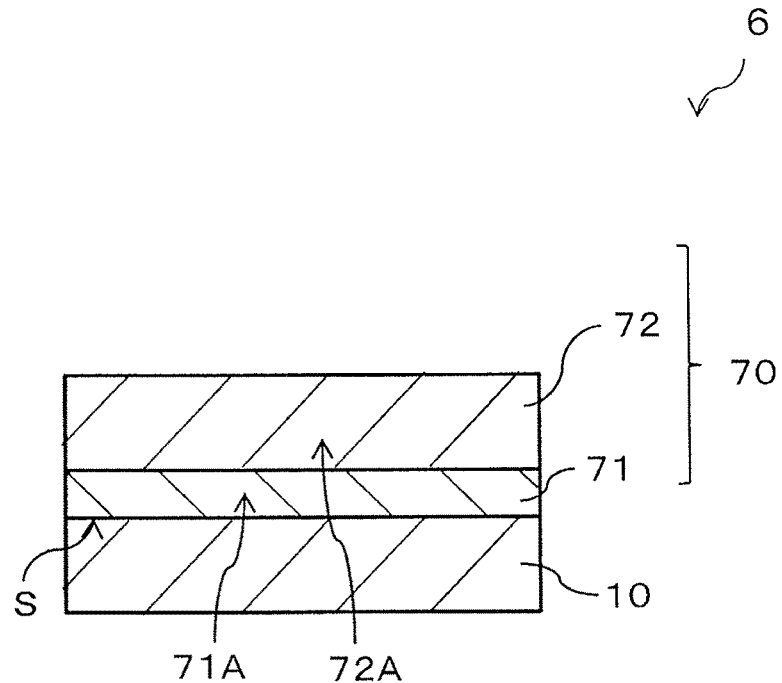
[ FIG. 18 ]
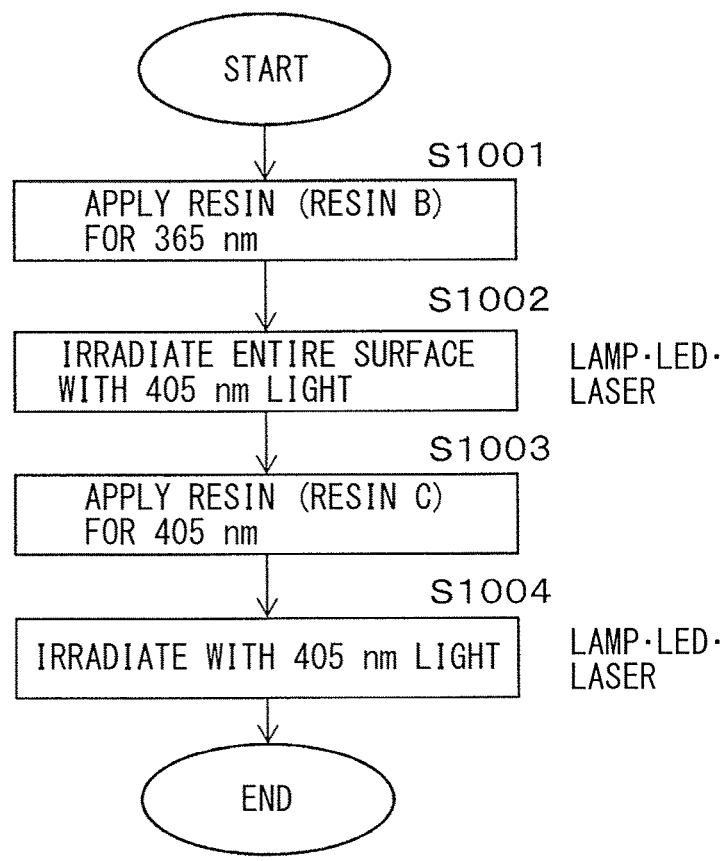

STEREOLITHOGRAPHIC OBJECT, PRODUCT, AND METHOD OF MANUFACTURING PRODUCT

CROSS REFERENCE TO RELATED APPLICATIONS

This application is a U.S. National Phase of International Patent Application No. PCT/JP2016/059340 filed on Mar. 24, 2016, which claims priority benefit of Japanese Patent Application No. JP 2015-099922 filed in the Japan Patent Office on May 15, 2015. Each of the above-referenced applications is hereby incorporated herein by reference in its entirety.

TECHNICAL FIELD

The technology relates to a stereolithographic object formed utilizing curable resin curable by light irradiation, a product, and a method of manufacturing a product.

BACKGROUND ART

In recent years, gel nails that involve curing of gel-state curable resin by ultraviolet light are popular. Recently, the number is increasing of people who enjoy putting on gel nails on fingers of their hands, feet, etc. not only in salons but also at home. The gel nails are characterized in that the gel nails have high adhesion characteristics with respect to nails and are easily kept for a long time. However, on the other hand, it is not easy to remove the gel nail. For example, it is necessary to damage a surface of the gel nail by scratching the surface of the gel nail with a nail file and thereby allow a remover to permeate the gel nail easily. Further, even in the case where the surface of the gel nail is damaged, it sometimes takes five minutes or longer to allow the remover to permeate the gel nail. As described above, it requires great effort to remove the gel nail.

To address this, there have been disclosed various ways to allow removing of the gel nail to be easier (for example, see PTLs 1 to 3).

CITATION LIST

Patent Literature

PTL 1: Japanese Unexamined Patent Application Publication No. 2013-177362
PTL 2: Japanese Unexamined Patent Application Publication No. 2013-43853
PTL 3: Japanese Unexamined Patent Application Publication No. H7-70519

SUMMARY OF THE INVENTION

However, in methods disclosed in PTLs 1 to 3, dedicated curable resin is necessary and there has been an issue of low versatility. It is to be noted that such an issue can arise independently of where to apply gel-state curable resin.

Therefore, it is desirable to provide a stereolithographic object that is easily removable without using dedicated curable resin, a product provided with the stereolithographic object, and a method of manufacturing a product.

A first stereolithographic object according to one embodiment of the technology includes: a first curable resin part that is provided at a position suitable for contact with a base member; and one or a plurality of second curable resin parts that are provided to be in contact with the first curable resin part and to allow part of a side surface of the first curable resin part to be exposed. The first curable resin part is configured by resin that has a functional group number and a polymer polymerization degree that are relatively small compared with those of the second curable resin part. The one or the plurality of second curable resin parts are configured by resin that has a functional group number and a polymer polymerization degree that are relatively great compared with those of the first curable resin part.

A first product according to one embodiment of the technology includes: a housing; a first curable resin part that is provided in contact with a surface of the housing, and one or a plurality of second curable resin parts that are provided to be in contact with the first curable resin part and to allow part of a side surface of the first curable resin part to be exposed. The first curable resin part is configured by resin that has a functional group number and a polymer polymerization degree that are relatively small compared with those of the second curable resin part. The one or the plurality of second curable resin parts are configured by resin that has a functional group number and a polymer polymerization degree that are relatively great compared with those of the first curable resin part.

In the first stereolithographic object and the first product according to the embodiment of the technology, two types of curable resin parts (the first curable resin part and the second curable resin part) that differ from each other in functional group number and polymer polymerization degree are provided. The first curable resin part is dissolved easily to a general remover compared to the second curable resin part. In the first stereolithographic object according to the embodiment of the technology, the first curable resin part that is dissolved easily to the general remover is provided at the position suitable for the contact with the base member. Further, the side surface of the first curable resin part is exposed to outside. This makes it possible to easily dissolve the first curable resin part by the general remover when the first stereolithographic object according to the embodiment of the technology is adhered to the surface of the base member. Moreover, when the first curable resin part is dissolved, a place where the first curable resin part has been present becomes a void. This void becomes a path through which the remover passes. It is therefore possible to easily dissolve also the second curable resin part by the general remover. Moreover, in the first stereolithographic object of the technology, the area in which the second curable resin part is in contact with the base member is small compared with a case where only the second curable resin part is in contact with the base member. In the first stereolithographic object of the technology, it is possible that the second curable resin part is not in contact with the base member in the first place. As described above, in the first stereolithographic object according to the embodiment of the technology, adherence characteristics with respect to the base member are decreased easily by the general remover.

A second stereolithographic object according to one embodiment of the technology includes: a plurality of curable resin parts that are each provided at a position suitable for contact with a base member; and a color curable resin layer that is provided in contact with the plurality of curable resin parts in a state in which a void is provided in a gap of the plurality of curable resin parts.

A second product according to one embodiment of the technology includes: a housing; curable resin parts that are provided in contact with a surface of the housing; and a color curable resin layer that is provided in contact with the plurality of curable resin parts in a state in which a void is provided in a gap of the plurality of curable resin parts.

In the second stereolithographic object and the second product according to the embodiment of the technology, the void is provided in the gap of the plurality of curable resin parts provided between the base member and the color curable resin layer. Thereby, the void provided in the gap of the plurality of curable resin parts becomes a path through which the remover passes, when the second stereolithographic object according to the embodiment of the technology is adhered to the surface of the base member. It is therefore possible to easily dissolve the plurality of curable resin parts by the general remover. Moreover, in the second stereolithographic object according to the embodiment of the technology, the area in which the color curable resin layer is in contact with the base member is small compared with that in a case where no void is provided between the base member and the color curable resin layer. In the second stereolithographic object of the technology, it is possible that the color curable resin layer is not in contact with the base member in the first place. As described above, in the second stereolithographic object according to the embodiment of the technology, adherence characteristics with respect to the base member are decreased easily by the general remover.

A first method of manufacturing a stereolithographic object according to one embodiment of the technology includes (A1) to (A3) described below.

(A1) Applying, to a surface of a base member, first resin that has high sensitivity in a first wavelength band (A2) Forming a first curable resin layer by irradiating the entire first resin with light in a wavelength band different from the first wavelength band, in which the first curable resin layer has a functional group number and a polymer polymerization degree that are relatively small (A3) Changing an upper part of the first curable resin layer into a second curable resin layer by irradiating the entire first curable resin layer with light in the first wavelength band, in which the second curable resin layer has a functional group number and a polymer polymerization degree that are relatively great compared with those of a lower part of the first curable resin layer In the first method of manufacturing the stereolithographic object according to the embodiment of the technology, two types of curable resin layers (the first curable resin layer and the second curable resin layer) that differ from each other in functional group number and polymer polymerization degree are formed. The first curable resin layer is dissolved easily to a general remover compared to the second curable resin layer. In the first method of manufacturing the stereolithographic object according to the embodiment of the technology, the first curable resin layer that is dissolved easily to the general remover is formed in contact with the base member. Further, the side surface of the first curable resin layer is exposed to the outside. This makes it possible to easily dissolve the first curable resin layer by the general remover after the first curable resin layer and the second curable resin layer are formed on the surface of the base member. As described above, in the first method of manufacturing the stereolithographic object according to the embodiment of the technology, the adherence characteristics with respect to the base member are decreased easily by the general remover.

A second method of manufacturing a stereolithographic object according to one embodiment of the technology includes (B1) to (B4) described below.

(B1) Applying, to a surface of a base member, first resin that has high sensitivity in a first wavelength band (B2) Forming a first curable resin layer by irradiating the entire first resin with light in a wavelength band different from the first wavelength band, in which the first curable resin layer has a functional group number and a polymer polymerization degree that are relatively small (B3) Applying, to an upper surface of the first curable resin layer, second resin that has high sensitivity in a second wavelength band, in which the second wavelength band is different from the first wavelength band (B4) Forming a second curable resin layer by irradiating the entire second resin with light in the second wavelength band, in which the second curable resin layer has a functional group number and a polymer polymerization degree that are relatively great compared with those of the first curable resin layer.

In the second method of manufacturing the stereolithographic object according to the embodiment of the technology, two types of curable resin layers (the first curable resin layer and the second curable resin layer) that differ from each other in functional group number and polymer polymerization degree are formed. The first curable resin layer is dissolved easily to a general remover compared to the second curable resin layer. In the second method of manufacturing the stereolithographic object according to the embodiment of the technology, the first curable resin layer that is dissolved easily to the general remover is formed in contact with the base member. Further, the side surface of the first curable resin layer is exposed to the outside. This makes it possible to easily dissolve the first curable resin layer by the general remover after the first curable resin layer and the second curable resin layer are stacked on the surface of the base member. As described above, in the second method of manufacturing the stereolithographic object according to the embodiment of the technology, the adherence characteristics with respect to the base member are decreased easily by the general remover.

A third method of manufacturing a stereolithographic object according to one embodiment of the technology includes (C1) to (C4) described below.

(C1) Applying, to a surface of a base member, first resin that has high sensitivity in a first wavelength band (C2) Forming a first curable resin layer by performing, on the first resin, pulse irradiation with laser light in the first wavelength band, in which the first curable resin layer includes a first curable resin part and one or a plurality of second curable resin parts, the first curable resin part has a functional group number and a polymer polymerization degree that are relatively small, the one or the plurality of second curable resin parts are in contact with the first curable resin part and allow part of a side surface of the first curable resin part to be exposed, and the one or the plurality of second curable resin parts each have a functional group number and a polymer polymerization degree that are relatively great compared with those of the first curable resin part (C3) Applying, to an upper surface of the first curable resin layer, second resin that has high sensitivity in a second wavelength band, in which the second wavelength band is different from the first wavelength band (C4) Forming a second curable resin layer, by irradiating the entire second resin with light in the second wavelength band, in which the second curable resin layer has a functional group number and a polymer polymerization degree that are relatively great compared with those of the first curable resin layer In the third method of manufacturing the stereolithographic object according to the embodiment of the technology, two types of curable resin parts (the first curable resin part and the second curable resin part) that differ from each other in functional group number and polymer polymerization degree are formed in the first curable resin layer that is in contact with the surface of the base member. The first curable resin part is dissolved easily to a general remover compared to the second curable resin part. In the third method of manufacturing the stereolithographic object according to the embodiment of the technology, the first curable resin part that is dissolved easily to the general remover is formed in contact with the base member. Further, the side surface of the first curable resin part is exposed to the outside. This makes it possible to easily dissolve the first curable resin part by the general remover after the first curable resin layer and the second curable resin layer are stacked on the surface of the base member. As described above, in the third method of manufacturing the stereolithographic object according to the embodiment of the technology, the adherence characteristics with respect to the base member are decreased easily by the general remover.

A fourth method of manufacturing a stereolithographic object according to one embodiment of the technology includes (D1) to (D3) described below.

(D1) Applying, to a surface of a base member, first resin that has high sensitivity in a first wavelength band (D2) Forming a curable resin layer by irradiating the entire first resin with light in a wavelength band different from the first wavelength band, in which the curable resin layer has a functional group number and a polymer polymerization degree that are relatively small (D3) Changing a plurality of columnar parts of the curable resin layer into a plurality of curable resin parts by performing, on the curable resin layer, pulse irradiation with laser light in the first wavelength band, in which the plurality of columnar parts are a part, of the curable resin layer, excluding part of a side surface of the curable resin layer and extending from a surface of the base member or a position away from the surface of the base member to an uppermost surface of the curable resin layer, and the plurality of curable resin parts each have a functional group number and a polymer polymerization degree that are relatively great compared with those of the curable resin layer before the irradiation.

In the fourth method of manufacturing the stereolithographic object according to the embodiment of the technology, two types of curable resin parts that differ from each other in functional group number and polymer polymerization degree are formed. The part (the first curable resin part), of the curable resin layer, excluding the plurality of curable resin parts is dissolved easily to a general remover compared to the plurality of curable resin parts (the second curable resin parts) formed in the curable resin layer. In the fourth method of manufacturing the stereolithographic object according to the embodiment of the technology, the first curable resin part that is dissolved easily to the general remover is formed in contact with the base member. Further, the side surface of the first curable resin part is exposed to the outside. This makes it possible to easily dissolve the first curable resin part by the general remover after the first curable resin part and the second curable resin part are formed on the surface of the base member. As described above, in the fourth method of manufacturing the stereolithographic object according to the embodiment of the technology, the adherence characteristics with respect to the base member are decreased easily by the general remover.

A fifth method of manufacturing a stereolithographic object according to one embodiment of the technology includes (E1) to (E3) described below.

(E1) Applying, to a surface of a base member, first resin that has high sensitivity in a predetermined wavelength band (E2) Forming a plurality of island-shaped or columnar first curable resin layers by performing, on the first resin, pulse irradiation with laser light in a wavelength band (E3) Forming a color curable resin layer that is in contact with the plurality of curable resin parts in a state in which a void is provided in a gap of the plurality of first curable resin layers In the fifth method of manufacturing the stereolithographic object according to the embodiment of the technology, the void is provided between the base member and the color curable resin layer by forming the plurality of curable resin parts on the base member. Thereby, the void provided in the gap of the plurality of curable resin parts becomes a path through which the remover passes. It is therefore possible to easily dissolve the plurality of curable resin parts by the general remover. Moreover, in the fifth method of manufacturing the stereolithographic object according to the embodiment of the technology, the area in which the color curable resin layer is in contact with the base member is small compared with a case where no void is provided between the base member and the color curable resin layer. In the fifth method of manufacturing the stereolithographic object according to the embodiment of the technology, it is possible that the color curable resin layer is not in contact with the base member in the first place. As described above, in the fifth method of manufacturing the stereolithographic object according to the embodiment of the technology, adherence characteristics with respect to the base member are decreased easily by the general remover.

According to the first and second stereolithographic objects, the first and second products, and the first to fifth method of manufacturing the stereolithographic object of the embodiments of the technology, the adhesion characteristics with respect to the base member are decreased easily by the general remover. Hence, it is possible to easily remove the stereolithographic object by the general remover without using the dedicated curable resin.

BRIEF DESCRIPTION OF DRAWINGS

FIG. 1 is a diagram illustrating an example of an outline configuration of a stereolithographic apparatus that is to be used in manufacturing of a product according to one embodiment of the technology.

FIG. 2A is a diagram illustrating an example of a perspective configuration of a stereolithographic object.

FIG. 2B is a diagram illustrating an example of the perspective configuration of the stereolithographic object.

FIG. 2C is a diagram illustrating an example of the perspective configuration of the stereolithographic object.

FIG. 2D is a diagram illustrating an example of the perspective configuration of the stereolithographic object.

FIG. 3 is a diagram illustrating an example of the outline configuration of the stereolithographic apparatus that is to be used in manufacturing of the product according to the embodiment of the technology.

FIG. 4 is a diagram illustrating an example of the outline configuration of the stereolithographic apparatus that is to be used in manufacturing of the product according to the embodiment of the technology.

FIG. 5 is a diagram illustrating an example of a cross-sectional configuration of a product according to a first embodiment of the technology.

FIG. 6 is a diagram illustrating characteristics of resin to be used in manufacturing the stereolithographic object.

FIG. 7A is a diagram illustrating an example of a procedure of manufacturing a stereolithographic object illustrated in FIG. 5.

FIG. 7B is a diagram illustrating an example of the procedure of manufacturing the stereolithographic object illustrated in FIG. 5.

FIG. 8 is a diagram illustrating an example of a cross-sectional configuration of a product according to a second embodiment of the technology.

FIG. 9A is a diagram illustrating an example of a procedure of manufacturing a stereolithographic object illustrated in FIG. 8.

FIG. 9B is a diagram illustrating an example of the procedure of manufacturing the stereolithographic object illustrated in FIG. 8.

FIG. 10A is a diagram illustrating an example of a cross-sectional configuration of a product according to a third embodiment of the technology.

FIG. 10B is a diagram illustrating an example of a cross-sectional configuration taken along a line A-A illustrated in FIG. 10A.

FIG. 11A is a diagram illustrating an example of a procedure of manufacturing a stereolithographic object illustrated in FIG. 10.

FIG. 11B is a diagram illustrating an example of the procedure of manufacturing the stereolithographic object illustrated in FIG. 10.

FIG. 12A is a diagram illustrating an example of a cross-sectional configuration of a product according to a fourth embodiment of the technology.

FIG. 12B is a diagram illustrating an example of a cross-sectional configuration taken along a line A-A illustrated in FIG. 12A.

FIG. 13 is a diagram illustrating a modification example of the cross-sectional configuration of the product illustrated in FIG. 12.

FIG. 14A is a diagram illustrating an example of a procedure of manufacturing a stereolithographic object illustrated in FIGS. 12 and 13.

FIG. 14B is a diagram illustrating an example of the procedure of manufacturing the stereolithographic object illustrated in FIGS. 12 and 13.

FIG. 15A is a diagram illustrating an example of a cross-sectional configuration of a product according to a fifth embodiment of the technology.

FIG. 15B is a diagram illustrating an example of a cross-sectional configuration taken along a line A-A illustrated in FIG. 15A.

FIG. 16 is a diagram illustrating an example of a procedure of manufacturing a stereolithographic object illustrated in FIG. 15.

FIG. 17 is a diagram illustrating an example of a cross-sectional configuration of a product according to a sixth embodiment of the technology.

FIG. 18 is a diagram illustrating an example of a procedure of manufacturing a stereolithographic object illustrated in FIG. 17.

MODES FOR CARRYING OUT THE INVENTION

A detailed description is given below of embodiments of the technology with reference to the drawings. It is to be noted that the description is given in the following order.

1. Stereolithographic Apparatus—Product (FIGS. 1 to 4)
2. First Embodiment (FIGS. 5 to 7B)
An example in which a layered base layer is formed by one type of resin and two types of light sources
3. Second Embodiment (FIGS. 8 to 9B)
An example in which the layered base layer is formed by two types of resin and one type of light source
4. Third Embodiment (FIGS. 10A to 11B)
An example in which the layered base layer is formed by two types of resin and two types of light sources
5. Fourth Embodiment (FIGS. 12A to 14B)
An example in which a columnar base layer is formed by one type of resin and two types of light sources
6. Fifth Embodiment (FIGS. 15A to 16)
An example in which a dot-shaped base layer is formed by one type of resin and one type of light source
7. Sixth Embodiment (FIGS. 17 and 18)
An example in which a single base layer is formed by one type of resin and one type of light source

1. Stereolithographic Apparatus—Product

A description is given of a product according to one embodiment of the technology and various stereolithographic apparatuses to be used in manufacturing this product.

FIG. 1 illustrates an example of an outline configuration of a stereolithographic apparatus 100 to be used in manufacturing the product according to the embodiment of the technology. The stereolithographic apparatus 100 is an apparatus that performs exposure on photocurable resin applied onto a target surface St of a base member 10, and is an apparatus that forms a shaped object 500 by utilizing curable resin curable by light irradiation.

The base member 10 may be a nail 1100 of a finger 1000 illustrated in FIG. 2A, an artificial nail 2000 illustrated in FIG. 2B, a mouse 3000 illustrated in FIG. 2C, or a smartphone cover 4000 illustrated in FIG. 2D, for example. The base member 10 may be anything other than those illustrated in FIGS. 2A to 2D. An outline part of the mouse 3000, an outline part of the smartphone cover 4000, etc. correspond to one specific example of a "housing" of the technology. A surface 1110 of the nail 1100, a surface 2100 of the artificial nail 2000, a gripping surface 3100 of the mouse 3000, and a surface 4100 of the smartphone cover 4000 each correspond to the target surface St of the base member 10. The surface 1100 of the nail 1100, the surface 2100 of the artificial nail 2000, and the gripping surface 3100 of the mouse 3000 are each a curved surface usually. Usually, in the surface 4100 of the smartphone cover 4000, a boundary between a main surface and a side surface is a curved surface. The shaped object 500 is formed, for example, on the surface 1110 of the nail 1100, the surface 2100 of the artificial nail 2000, the gripping surface 3100 of the mouse 3000, or the surface 4100 of the smartphone cover 4000, as illustrated in FIGS. 2A to 2D. For example, on the surface 4100 of the smartphone cover 4000, the shaped object 500 is formed in a region including a boundary part (a curved surface part) between the main surface and the side surface.

As illustrated in FIG. 2B, a thing including the artificial nail 2000 and the shaped object 500 formed on the surface 2100 of the artificial nail 2000 corresponds to one specific example of a "product" of the technology. Further, as illustrated in FIG. 2C, a thing including the mouse 3000 and the shaped object 500 formed on the gripping surface 3100 of the mouse 3000 corresponds to one specific example of the "product" of the technology. Further, as illustrated in FIG. 2D, a thing including the smartphone cover 4000 and the shaped object 500 formed on the surface 4100 of the smartphone cover 4000 corresponds to one specific example of the "product" of the technology.

As illustrated in FIG. 1, the stereolithographic apparatus 1 includes a light source unit 110, a movable mirror 120, a sensor unit 130, a driver unit 140, a controller unit 150, and a storage unit 160, for example.

The light source unit 110 outputs collimated light on the basis of a driving signal from the driver unit 140. The light source unit 110 performs continuous irradiation or pulse irradiation on the basis of the driving signal from the driver unit 140, for example. The light source unit 110 includes a light-emitting device 111 that outputs ultraviolet light, and a collimator lens 112 that is disposed on an optical path of the ultraviolet light to be outputted from the light-emitting device 111, for example. The collimator lens 112 causes the light outputted from the light-emitting device 111 to be a bundle of parallel rays (collimated light Lc1) by refraction by means of a lens. It is to be noted that the light source unit 110 may have, instead of the collimator lens 112, an optical member that causes the light outputted from the light-emitting device 111 to be a bundle of parallel rays by reflection by means of a mirror.

The light-emitting device 111 includes one or a plurality of semiconductor lasers or one or a plurality of light-emitting diodes, for example. The semiconductor laser or the light-emitting diode that outputs the ultraviolet light is configured to include at least one of a semiconductor that is able to output light in a band of 405 nm or a semiconductor that is able to output light in a band of 365 nm, for example. The semiconductor laser that outputs the ultraviolet light is configured of a lamination, on an n-type GaN substrate, including an n-type AlGaN cladding layer, an n-type GaN guide layer, a GaInN multiple quantum well layer, a p-type AlGaN electron blocking layer, a p-type GaN guide layer, a p-type AlGaN cladding layer, and a p-type GaN contact layer, for example. Generally, a beam spot diameter of the semiconductor laser is smaller than a beam spot diameter of the light-emitting diode. Therefore, in a case where the one or the plurality of semiconductor lasers are used as the light-emitting device 111, a beam spot diameter of the light-emitting device 111 is extremely small. Hence, it is possible to easily obtain a high energy density.

The movable mirror 120 is disposed on an optical path of the collimated light Lc1 outputted from the light source unit 110. The movable mirror 120 reflects the collimated light Lc1 outputted from the light source unit 110, and causes reflected light Lr1 of the collimated light Lc1 from the movable mirror 120 to scan the target surface St on the basis of the driving signal from the driver unit 140. The movable mirror 120 is configured to include a MEMS (Micro Electro Mechanical Systems) mirror, a polygon mirror, or a galvano mirror, for example.

The sensor unit 130 acquires position data Ds of a predetermined region including the target surface St. The position data Ds includes coordinates (plane coordinates) regarding an in-plane position of the target surface St and coordinates (coordinates in a height direction of the target surface St) regarding a surface shape of the target surface St. The sensor unit 130 is configured to include a distance sensor, for example. The driver unit 140 drives the light source unit 110, the movable mirror 120, and the sensor unit 130 on the basis of a control signal from the controller unit 150. The storage unit 160 is configured to be able to store three-dimensional coordinate data Dt, for example. A device configured by the storage unit 160 and the controller unit 150 is configured by an electronic device such as a smartphone, for example.

The controller unit 150 controls the light source unit 110, the movable mirror 120, and the sensor unit 130, via the driver unit 140. The controller unit 150 causes the movable mirror 120 to be displaced via the driver unit 140. The controller unit 150 thereby causes the reflected light Lr1 of the collimated light Lc1 from the movable mirror 120 to scan the target surface St. Further, the controller unit 150 reads the three-dimensional coordinate data Dt from the storage unit 160, and thereafter, controls light emission of the light source unit 110 on the basis of the three-dimensional coordinate data Dt via the driver unit 140.

The controller unit 150 controls the light emission of the light source unit 110 on the basis of the position data Ds and the three-dimensional coordinate data Dt. The controller unit 50 controls the light emission of the light source unit 10 on the basis of the position data Ds acquired before performing the scanning, and the three-dimensional coordinate data Dt. Specifically, the controller unit 150 corrects the three-dimensional coordinate data Dt on the basis of the position data Ds acquired before performing the scanning, and controls the light emission of the light source unit 110 on the basis of three-dimensional coordinate data Dt' after the correction.

Next, a description is given of an example of a procedure of producing the shaped object 500 by utilizing the stereolithographic apparatus 100. First, the stereolithographic apparatus 100 acquires the three-dimensional coordinate data Dt. For example, a user selects a design of the shaped object 500, and inputs, to the stereolithographic apparatus 100, the three-dimensional coordinate data Dt of the selected design. Alternatively, the user draws a design by himself or herself, and inputs the three-dimensional coordinate data Dt of the design that the user has drawn to the stereolithographic apparatus 100. By allowing the user to perform the selection in the foregoing method, the stereolithographic apparatus 100 acquires the three-dimensional coordinate data Dt, for example. Alternatively, by allowing the user to perform the input in the foregoing method, the stereolithographic apparatus 100 acquires the three-dimensional coordinate data Dt, for example.

In the case where the device configured by the storage unit 160 and the controller unit 150 is configured by the electronic device such as the smartphone, the stereolithographic apparatus 100 may display a plurality of designs on a screen of the electronic device, and allow the user to select one design from those designs. The stereolithographic apparatus 100 may download, via the Internet, the three-dimensional coordinate data Dt of the design selected by the user. Further, in a case where the screen of the electronic device has a touch input function, the stereolithographic apparatus 100 may receive the input of the design by the user by allowing the user to draw the design on the screen of the electronic device. On this occasion, the stereolithographic apparatus 100 may generate the three-dimensional coordinate data Dt on the basis of the design inputted by the user.

Next, the user applies photosensitive resin to the surface 4100 of the smartphone cover 4000, for example. The photosensitive resin is resin that is curable at least by the ultraviolet light outputted from the light-emitting device 111. In a case where the stereolithographic apparatus 100 includes a mechanism that applies the photosensitive resin to the target surface St, the stereolithographic apparatus 100 may apply the photosensitive resin to the surface 4100 of the smartphone cover 4000 in accordance with a request from the user to apply the photosensitive resin.

Next, the user makes a request for a process of the photosensitive resin with respect to the stereolithographic apparatus 100 in a state where the smartphone cover 4000 is inserted in a predetermined place in the stereolithographic apparatus 100. When an instruction to perform the process on the photosensitive resin by the light source unit 110 is inputted by the user, the stereolithographic apparatus 100 controls the light emission of the light source unit 110 on the basis of the position data Ds and the three-dimensional coordinate data Dt.

Specifically, first, the stereolithographic apparatus 100 acquires the position data Ds before performing the scanning by the reflected light Lr1. The stereolithographic apparatus 100 acquires the position data Ds as follows, for example. First, the controller unit 150 generates a control signal, and outputs the generated control signal to the driver unit 140. The control signal causes the light-emitting device 111 to perform continuous light emission or pulse light emission and causes the movable mirror 120 to operate. On the basis of the control signal inputted from the controller unit 150, the driver unit 140 causes the light-emitting device 111 to perform the continuous light emission or the pulse light emission, and causes the movable mirror 120 to operate. Thereby, the continuously-emitted light or the pulse light outputted from the light-emitting device 111 is caused to be the collimated light Lc1 by the collimator lens 112. The collimated light Lc1 is reflected by the movable mirror 120, and the reflected light Lr1 from the movable mirror 120 scans a predetermined region including all or part of the surface 4100 of the smartphone cover 4000. As a result, light (reflected light Lr2) reflected by the surface 4100 of the smartphone cover 4000, etc. of the reflected light Lr1 is detected by the sensor unit 130. Further, part of the collimated light Lc1 is detected by the sensor unit 130. For example, the sensor unit 130 derives a time difference (a time difference in pulse) between the reflected light Lr2 and part of the collimated light Lc1, and measures a distance from the predetermined region including the target surface St to the movable mirror 120, on the basis of the derived time difference. Further, the sensor unit 130 derives, by the sensor unit 130, the position data Ds of the region including the target surface St on the basis of the distance from the predetermined region including the target surface St to the movable mirror 120.

Next, the stereolithographic apparatus 100 derives the three-dimensional coordinate data Dt' by correcting the three-dimensional coordinate data Dt on the basis of the position data Ds acquired before performing the scanning by the reflected light Lr1. On this occasion, the stereolithographic apparatus 100 may perform correction on an as-needed basis depending on a size, a shape, etc. of the surface 4100 of the smartphone cover 4000. The correction includes enlarging and reducing the three-dimensional coordinate data Dt, revising an aspect ratio of the three-dimensional coordinate data Dt, etc.

Next, the stereolithographic apparatus 100 controls the light emission of the light source unit 110 on the basis of the three-dimensional coordinate data Dt'. Further, the stereolithographic apparatus 100 controls the scanning by the movable mirror 120 using the light emitted from the light source unit 110. The stereolithographic apparatus 100 may control the scanning by the movable mirror 120 using the light emitted from the light source unit 110 on the basis of the three-dimensional coordinate data Dt' on an as-needed basis.

When the optical scanning by the movable mirror 120 is completed, the stereolithographic apparatus 100 notifies the user that the process of the photosensitive resin is completed. After confirming the notification, the user wipes off and removes uncured photosensitive resin by alcohols (for example, ethanol) on an as-needed basis.

When the producing of the shaped object 500 has not been completed yet, the user re-insert the smartphone cover 4000 into the predetermined place in the stereolithographic apparatus 100, and thereafter, makes a request for the process of the photosensitive resin again with respect to the stereolithographic apparatus 100. When the instruction to perform the process of the photosensitive resin is inputted by the user, the stereolithographic apparatus 100 executes the foregoing procedure again.

Next, a description is given of other stereolithographic apparatus to be used in manufacturing the product according to the embodiment of the technology.

(Stereolithographic Apparatus 200)

FIG. 3 illustrates an example of an outline configuration of a stereolithographic apparatus 200 to be used in manufacturing the product according to the embodiment of the technology. The stereolithographic apparatus 200 is an apparatus that performs exposure on photocurable resin applied onto the target surface St of the base member 10, and is an apparatus that forms the shaped object 500 by utilizing curable resin curable by light irradiation, as with the stereolithographic apparatus 100. The stereolithographic apparatus 200 corresponds to an apparatus further including a light source unit 170 in the stereolithographic apparatus 100.

In the stereolithographic apparatus 200, the driver unit 140 drives the light source unit 170 on the basis of a control signal from the controller unit 150. The controller unit 150 controls the light light source unit 170 via the driver unit 140. The light source unit 170 outputs diffused light on the basis of a driving signal from the driver unit 140. The light source unit 110 includes a lamp that outputs ultraviolet light, for example. As the lamp that outputs the ultraviolet light, a high-pressure mercury lamp that is able to output light in a band of 365 nm can be mentioned, for example. The light source unit 110 may include a light-emitting diode that outputs the ultraviolet light. As the light-emitting diode that outputs the ultraviolet light, a light-emitting diode that is able to output the light in the band of 365 nm or a light-emitting diode that is able to emit light in a band of 405 nm can be mentioned, for example.

After acquiring the three-dimensional coordinate data Dt, the stereolithographic apparatus 200 performs an operation similar to that of the stereolithographic apparatus 100. Further, when an instruction to perform a process on the photosensitive resin by the light source unit 170 is inputted by the user, the stereolithographic apparatus 200 causes the light source unit 170 to emit light.

(Stereolithographic Apparatus 300)

FIG. 4 illustrates an example of an outline configuration of a stereolithographic apparatus 300 to be used in manufacturing the product according to the embodiment of the technology. The stereolithographic apparatus 300 is an apparatus that performs exposure on photocurable resin applied onto the target surface St of the base member 10, and is an apparatus that forms the shaped object 500 by utilizing curable resin curable by light irradiation, as with the stereolithographic apparatus 200. The stereolithographic apparatus 300 corresponds to an apparatus omitting the light source unit 110, the movable mirror 120, the sensor unit 130, and the storage unit 160 in the stereolithographic apparatus 200. In other words, the stereolithographic apparatus 300 includes the driver unit 140, the controller unit 150, and the light source unit 170. When the instruction to perform the process on the photosensitive resin is inputted by the user, the stereolithographic apparatus 300 causes the light source unit 170 to emit light.

2. First Embodiment

Next, a description is given of a product 1 according to a first embodiment of the technology.

[Configuration]

FIG. 5 illustrates an example of a cross-sectional configuration of a product 1 according to the first embodiment of the technology. The product 1 includes the base member 10 and a stereolithographic object 20 that is provided in contact with the surface of the base member 10. The base member 10 corresponds to one specific example of a "base member" and the "housing" of the technology. The stereolithographic object 20 corresponds to one specific example of a "stereolithographic object" of the technology. The surface of the base member 10 serves as a contact surface S with the stereolithographic object 20. The stereolithographic object 20 includes a base layer 21 provided in contact with the contact surface S, and a color layer 22 provided in contact with an upper surface of the base layer 21. The base layer 21 has a role as a base of the color layer 22, a role as a peeling layer that is used when the color layer 22 is peeled off from the base member 10, etc. The color layer 22 has a role as a decoration of the product 1. The base layer 21 may have the role as the decoration of the product 1. The base layer 21 corresponds to one specific example of a "base layer" of the technology. The color layer 22 corresponds to one specific example of a "color curable resin layer" of the technology.

The base layer 21 is configured by a first base layer 23 and a second base layer 24 that are stacked on each other. The first base layer 23 corresponds to one specific example of a "first base layer" of the technology. The second base layer 24 corresponds to one specific example of a "second base layer" of the technology. The first base layer 23 is provided at a position suitable for contact with the base member 10, and is provided in contact with the surface (the contact surface S) of the base member 10. The second base layer 24 is provided in contact with the first base layer 23 so that part of a side surface of the first base layer 23 is exposed. The second base layer 24 is provided in contact with an upper surface of the first base layer 23. Accordingly, in the product 1, the side surface of the first base layer 23 is exposed to outside.

The first base layer 23 is filled with a first curable resin part 21A that has a functional group number and a polymer polymerization degree that are relatively small compared with those of the second base layer 24. The second base layer 24 is filled with a second curable resin part 21B that has a functional group number and a polymer polymerization degree that are relatively great compared with those of the first base layer 23. In other words, the stereolithographic object 20 includes the first curable resin part 21A and the second curable resin part 21B. The first curable resin part 21A corresponds to one specific example of a "first curable resin part" of the technology. The second curable resin part 21B corresponds to one specific example of a "second curable resin part" of the technology. The first curable resin part 21A is provided in contact with the contact surface S. The first curable resin part 21A is provided in contact with the contact surface S. Functional groups that contribute to polymerization are an OH group (a hydroxyl group), a COOH group (a carboxyl group), and an $NH_2$ group (an amino group), for example.

The first curable resin part 21A and the second curable resin part 21B are configured by members formed by curing ultraviolet curable resin. The ultraviolet curable resin (resin α) used as a raw material of the first curable resin part 21A and the second curable resin part 21B is configured to include at least a polymerizable monomer and a photopolymerization initiator. The resin α includes the polymerizable monomer, a polymerizable oligomer, the photopolymerization initiator, a sensitizer, and an additive, for example. The resin α is radical-polymerization-type resin, for example. The polymerizable monomer included in the resin α is an acrylate monomer, for example. The polymerizable oligomer included in the resin α is urethane acrylate, polyester acrylate, epoxy acrylate, or acryl acrylate, for example. The photopolymerization initiator included in the resin α is a benzophenone-based initiator, an acetophenone-based initiator, or a thioxanthone-based initiator, for example. The sensitizer included in the resin α is tertiary amine, for example. The additive includable in the resin α is a polymerization inhibitor, various fillers (filling materials), a leveling agent, a fluidity adjuster, an antifoamer, or a plasticizer, for example.

The first curable resin part 21A and the second curable resin part 21B may be colorless and transparent, or may have a hue. In a case where the first curable resin part 21A and the second curable resin part 21B have the hues, the first curable resin part 21A and the second curable resin part 21B may include a dye or a pigment as the additive.

The color layer 22 is configured by a member formed by curing ultraviolet curable resin. The ultraviolet curable resin (resin β) used as a raw material of the color layer 22 is configured to include at least a polymerizable monomer and a photopolymerization initiator. The resin β includes the polymerizable monomer, a polymerizable oligomer, the photopolymerization initiator, a sensitizer, and an additive, for example. The resin β is radical-polymerization-type resin, for example. The polymerizable monomer included in the resin β is an acrylate monomer, for example. The polymerizable oligomer included in the resin β is urethane acrylate, polyester acrylate, epoxy acrylate, or acryl acrylate, for example. The photopolymerization initiator included in the resin β is a benzophenone-based initiator, an acetophenone-based initiator, or a thioxanthone-based initiator, for example. The sensitizer included in the resin β is tertiary amine, for example. The additive includable in the resin β is a polymerization inhibitor, various fillers (filling materials), a leveling agent, a fluidity adjuster, an antifoamer, or a plasticizer, for example. The color layer 22 corresponds to a main part of the decoration of the shaped object 500. Accordingly, the color layer 22 has a hue for the decoration of the shaped object 500, and includes a dye or a pigment as the additive.

[Manufacturing Method]

Next, a description is given of a method of manufacturing the stereolithographic object 20.

FIG. 6 illustrates an example of characteristics of the resin (the resin α described above) to be used in manufacturing the stereolithographic object 20. As the resin α, for example, ultraviolet curable resin (resin A) that has high sensitivity in the band of 405 nm and has lower sensitivity in the band of 365 nm than in the band of 405 nm can be used, as illustrated in an upper part of FIG. 6. Further, as the resin α, for example, ultraviolet curable resin (resin B) that has high sensitivity in the band of 365 nm and has lower sensitivity in the band of 405 nm than in the band of 365 nm can be used, as illustrated in a lower part of FIG. 6.

FIG. 7A illustrates an example of a procedure of manufacturing the stereolithographic object 20. Any apparatus of the stereolithographic apparatus 100, the stereolithographic apparatus 200, and the stereolithographic apparatus 300 is used upon the manufacturing of the stereolithographic object 20. First, the resin (the resin B) that has high sensitivity in the band of 365 nm is applied to the surface of the base member 10 (step S101). The band of 365 nm corresponds to one specific example of a "first wavelength band" of the technology. The resin B corresponds to one specific example of "first resin" of the technology. Next, the entire resin B is irradiated with light in a wavelength band (the band of 405 nm) different from the sensitive wavelength band (the band of 365 nm) of the resin B (step S102). On this occasion, the entire resin B is irradiated with laser light or LED light from the light source unit 110 or lamp light or LED light from the light source unit 170. Thereby, a first curable resin layer 23A is formed that has a functional group number and a polymer polymerization degree that are relatively small. The first curable resin layer 23A corresponds to one specific example of a "first curable resin layer" of the technology. The first curable resin layer 23A is configured by a material same as that of the first curable resin part 21A.

Next, the entire first curable resin layer 23A is irradiated with light in the sensitive wavelength band (the band of 365 nm) of the resin B (step S103). On this occasion, the entire first curable resin layer 23A is irradiated with the laser light or the LED light from the light source unit 110 or the lamp light or the LED light from the light source unit 170. Thereby, an upper part of the first curable resin layer 23A is changed into the second base layer 24 that has a functional group number and a polymer polymerization degree that are relatively great compared to those of a lower part of the first curable resin layer 23A. As a result, the rest of the first curable resin layer 23A becomes the first base layer 23. The second base layer 24 corresponds to one specific example of a "second curable resin layer" of the technology.

Next, resin (resin C) that has high sensitivity in a wavelength band (the band of 405 nm) different from the sensitive wavelength band of the resin B is applied to an upper surface of the base layer 21 (the second base layer 24) (step S104). The resin C is ultraviolet curable resin to be used as a raw material of the color layer 22. Next, the entire resin C is irradiated with light in a wavelength band (that is, the sensitive wavelength band of the resin C (the band of 405 nm)) different from the sensitive wavelength band (the band of 365 nm) of the resin B (step S105). On this occasion, the entire resin C is irradiated with the laser light or the LED light from the light source unit 110 or the lamp light or the LED light from the light source unit 170 to thereby form the color layer 22. Thus, the stereolithographic object 20 is manufactured on the base member 10.

FIG. 7B illustrates an example of a procedure of manufacturing the stereolithographic object 20. Any apparatus of the stereolithographic apparatus 100, the stereolithographic apparatus 200, and the stereolithographic apparatus 300 is used upon the manufacturing of the stereolithographic object 20. First, the resin (the resin A) that has high sensitivity in the band of 405 nm is applied to the surface of the base member 10 (step S201). The band of 405 nm corresponds to one specific example of the "first resin" of the technology. The resin A corresponds to one specific example of the "first resin" of the technology. Next, the entire resin A is irradiated with light in a wavelength band (the band of 365 nm) different from the sensitive wavelength band (the band of 405 nm) of the resin A (step S202). On this occasion, the entire resin A is irradiated with laser light or LED light from the light source unit 110 or lamp light or LED light from the light source unit 170. Thereby, a first curable resin layer 23B is formed that has a functional group number and a polymer polymerization degree that are relatively small. The first curable resin layer 23B corresponds to one specific example of the "first curable resin layer" of the technology. The first curable resin layer 23B is configured by a material same as that of the first curable resin part 21A.

Next, the entire first curable resin layer 23B is irradiated with light in the sensitive wavelength band (the band of 405 nm) of the resin A (step S203). On this occasion, the entire first curable resin layer 23B is irradiated with the laser light or the LED light from the light source unit 110 or the lamp light or the LED light from the light source unit 170. Thereby, an upper part of the first curable resin layer 23B is changed into the second base layer 24 that has a functional group number and a polymer polymerization degree that are relatively great compared to those of a lower part of the first curable resin layer 23B. As a result, the rest of the first curable resin layer 23B becomes the first base layer 23. The second base layer 24 corresponds to one specific example of the "second curable resin layer" of the technology.

Next, resin (resin D) that has high sensitivity in a wavelength band (the band of 365 nm) different from the sensitive wavelength band (the wavelength band of 405 nm) of the resin A is applied to an upper surface of the base layer 21 (the second base layer 24) (step S204). Next, the entire resin D is irradiated with light in a wavelength band (that is, the sensitive wavelength band of the resin D (the band of 365 nm)) different from the sensitive wavelength band (the band of 405 nm) of the resin A (step S205). On this occasion, the entire resin D is irradiated with the laser light or the LED light from the light source unit 110 or the lamp light or the LED light from the light source unit 170 to thereby form the color layer 22. Thus, the stereolithographic object 20 is manufactured on the base member 10.

[Effects]

Next, a description is given of effects of the method of manufacturing the stereolithographic object 20 according to the present embodiment.

In the present embodiment, there are formed two types of cured resin layers (the first base layer 23 and the second base layer 24) that differ from each other in the functional group number and the polymer part by weight. The first base layer 23 is dissolved easily to a general remover compared with the second base layer 24. In the present embodiment, the first base layer 23 that is dissolved easily to the general remover is formed in contact with the base member 10. Further, the side surface of the first base layer 23 is exposed to the outside. This makes it possible to easily dissolve the first base layer 23 by the general remover after the first base layer 23 and the second base layer 24 are formed on the base member 10. As described above, the adhesion characteristics with respect to the base member 10 are decreased easily by the general remover in the present embodiment. As a result, it is possible to easily remove the stereolithographic object 20 by the general remover without using dedicated curable resin.

3. Second Embodiment

Next, a description is given of a product 2 according to a second embodiment of the technology.

[Configuration]

FIG. 8 illustrates an example of a cross-sectional configuration of a product 2 according to the second embodiment of the technology. The product 2 includes the base member 10 and a stereolithographic object 30 that is provided in contact with the surface of the base member 10. The base member 10 corresponds to one specific example of the "base member" and the "housing" of the technology. The stereolithographic object 30 corresponds to one specific example of the "stereolithographic object" of the technology. The surface of the base member 10 serves a contact surface S with the stereolithographic object 30. The stereolithographic object 30 includes a base layer 31 provided in contact with the contact surface S, and the color layer 22 provided in contact with an upper surface of the base layer 31. The base layer 31 has a role as a base of the color layer 22, a role as a peeling layer that is used when the color layer 22 is peeled off from the base member 10, etc. The color layer 22 has a role as a decoration of the product 2. The base layer 31 may have the role as the decoration of the product 2. The base layer 31 corresponds to one specific example of the "base layer" of the technology. The color layer 22 corresponds to one specific example of the "color curable resin layer" of the technology.

The base layer 31 is configured by a first base layer 33 and a second base layer 34 that are stacked on each other. The first base layer 33 corresponds to one specific example of the "first base layer" of the technology. The second base layer 34 corresponds to one specific example of the "second base layer" of the technology. The first base layer 33 is provided at a position suitable for contact with the base member 10, and is provided in contact with the surface (the contact surface S) of the base member 10. The second base layer 34 is provided in contact with the first base layer 33 so that part of a side surface of the first base layer 33 is exposed. The second base layer 34 is provided in contact with an upper surface of the first base layer 33. Accordingly, in the product 2, the side surface of the first base layer 33 is exposed to outside.

The first base layer 33 is filled with a first curable resin part 31A that has a functional group number and a polymer polymerization degree that are relatively small compared with those of the second base layer 34. The second base layer 24 is filled with a second curable resin part 31B that has a functional group number and a polymer polymerization degree that are relatively great compared with those of the first curable resin part 31A. In other words, the stereolithographic object 30 includes the first curable resin part 31A and the second curable resin part 31B that are stacked on each other. The first curable resin part 31A corresponds to one specific example of the "first curable resin part" of the technology. The second curable resin part 31B corresponds to one specific example of the "second curable resin part" of the technology. The first curable resin part 31A is provided in contact with the contact surface S. The second curable resin part 31B is provided in contact with the first curable resin part 31A.

The first curable resin part 31A and the second curable resin part 31B are configured by members formed by curing ultraviolet curable resin. The ultraviolet curable resin (the foregoing resin a) used as a raw material of the first curable resin part 31A and the second curable resin part 31B is configured to include at least a polymerizable monomer and a photopolymerization initiator. The first curable resin part 31A and the second curable resin part 31B may be colorless and transparent, or may have a hue. In a case where the first curable resin part 31A and the second curable resin part 31B have the hues, a dye or a pigment is included as the additive of the resin α.

[Manufacturing Method]

Next, a description is given of a method of manufacturing the stereolithographic object 30.

FIG. 9A illustrates an example of a procedure of manufacturing the stereolithographic object 30. Any apparatus of the stereolithographic apparatus 100, the stereolithographic apparatus 200, and the stereolithographic apparatus 300 is used upon the manufacturing of the stereolithographic object 30. First, the resin (the resin B) that has high sensitivity in the band of 365 nm is applied to the surface of the base member 10 (step S301). The band of 365 nm corresponds to one specific example of the "first wavelength band" of the technology. The resin B corresponds to one specific example of the "first resin" of the technology. Next, the entire resin B is irradiated with light in a wavelength band (the band of 405 nm) different from the sensitive wavelength band (the band of 365 nm) of the resin B (step S302). On this occasion, the entire resin B is irradiated with laser light or LED light from the light source unit 110 or lamp light or LED light from the light source unit 170. Thereby, a first base layer 33 is formed that has a functional group number and a polymer polymerization degree that are relatively small. The first base layer 33 corresponds to one specific example of the "first curable resin layer" of the technology.

Next, the resin (the resin A) that has high sensitivity in a wavelength band (the band of 405 nm) different from the sensitive wavelength band (the band of 365 nm) of the resin B is applied to an upper surface of the first base layer 33 (step S303). The band of 405 nm corresponds to one specific example of a "second wavelength band" of the technology. The resin A corresponds to one specific example of "second resin" of the technology. Next, the entire resin A is irradiated with light in a wavelength band (that is, the sensitive wavelength band of the resin A (the band of 405 nm)) different from the sensitive wavelength band (the band of 365 nm) of the resin B (step S304). On this occasion, the entire resin A is irradiated with the laser light or the LED light from the light source unit 110 or the lamp light or the LED light from the light source unit 170. Thereby, a second base layer 34 is formed that has a functional group number and a polymer polymerization degree that are relatively great compared to those of the first base layer 33. The second base layer 34 corresponds to one specific example of the "second curable resin layer" of the technology.

Next, the resin (the resin C) that has high sensitivity in a wavelength band (the band of 405 nm) different from the sensitive wavelength band (the band of 365 nm) of the resin B is applied to an upper surface of the base layer 31 (the second base layer 34) (step S305). Next, the entire resin C is irradiated with light in a wavelength band (that is, the sensitive wavelength band of the resin C (the band of 405 nm)) different from the sensitive wavelength band (the band of 365 nm) of the resin B (step S306). On this occasion, the entire resin C is irradiated with the laser light or the LED light from the light source unit 110 or the lamp light or the LED light from the light source unit 170, to thereby form the color layer 22. Thus, the stereolithographic object 30 is manufactured on the base member 10.

FIG. 9B illustrates an example of a procedure of manufacturing the stereolithographic object 30. Any apparatus of the stereolithographic apparatus 100, the stereolithographic apparatus 200, and the stereolithographic apparatus 300 is used upon the manufacturing of the stereolithographic object 30. First, the resin (the resin A) that has high sensitivity in the band of 405 nm is applied to the surface of the base member 10 (step S401). The band of 405 nm corresponds to one specific example of the "first wavelength band" of the technology. The resin A corresponds to one specific example of the "first resin" of the technology. Next, the entire resin A is irradiated with light in a wavelength band (the band of 405 nm) different from the sensitive wavelength band (the band of 405 nm) of the resin A (step S402). On this occasion, the entire resin A is irradiated with laser light or LED light from the light source unit 110 or lamp light or LED light from the light source unit 170. Thereby, the first base layer 33 is formed that has a functional group number and a polymer polymerization degree that are relatively small. The first base layer 33 corresponds to one specific example of the "first curable resin layer" of the technology.

Next, the resin (the resin B) that has high sensitivity in a wavelength band (the band of 365 nm) different from the sensitive wavelength band (the band of 405 nm) of the resin A is applied to an upper surface of the first base layer 33 (step S403). The band of 365 nm corresponds to one specific example of the "second wavelength band" of the technology. The resin B corresponds to one specific example of the "second resin" of the technology. Next, the entire resin B is irradiated with light in a wavelength band (that is, the sensitive wavelength band of the resin B (the band of 365 nm)) different from the sensitive wavelength band (the band of 405 nm) of the resin A (step S404). On this occasion, the entire resin B is irradiated with the laser light or the LED light from the light source unit 110 or the lamp light or the LED light from the light source unit 170. Thereby, the second base layer 34 is formed that has a functional group number and a polymer polymerization degree that are relatively great compared to those of the first base layer 33. The second base layer 34 corresponds to one specific example of the "second curable resin layer" of the technology.

Next, the resin (the resin D) that has high sensitivity in a wavelength band (the band of 365 nm) different from the sensitive wavelength band (the band of 405 nm) of the resin A is applied to an upper surface of the base layer 31 (the second base layer 34) (step S405). Next, the entire resin D is irradiated with light in a wavelength band (that is, the sensitive wavelength band of the resin D (the band of 365 nm)) different from the sensitive wavelength band (the band of 405 nm) of the resin A (step S406). On this occasion, the entire resin D is irradiated with the laser light or the LED light from the light source unit 110 or the lamp light or the LED light from the light source unit 170, to thereby form the color layer 22. Thus, the stereolithographic object 30 is manufactured on the base member 10.

[Effects]

Next, a description is given of effects of the method of manufacturing the stereolithographic object 30 according to the present embodiment.

In the present embodiment, there are formed two types of cured resin layers (the first base layer 33 and the second base layer 34) that differ from each other in the functional group number and the polymer part by weight. The first base layer 33 is dissolved easily to a general remover compared with the second base layer 34. In the present embodiment, the first base layer 33 that is dissolved easily to the general remover is formed in contact with the base member 10. Further, the side surface of the first base layer 33 is exposed to the outside. This makes it possible to easily dissolve the first base layer 33 by the general remover after the first base layer 33 and the second base layer 34 are formed on the base member 10. As described above, the adhesion characteristics with respect to the base member 10 are decreased easily by the general remover in the present embodiment. As a result, it is possible to easily remove the stereolithographic object 30 by the general remover without using dedicated curable resin.

4. Third Embodiment

Next, a description is given of a product 3 according to a third embodiment of the technology.

[Configuration]

FIG. 10A illustrates an example of a cross-sectional configuration of a product 3 according to the third embodiment of the technology. FIG. 10B illustrates an example of a cross-sectional configuration taken along a line A-A in FIG. 10A. The product 3 includes the base member 10 and a stereolithographic object 40 that is provided in contact with the surface of the base member 10. The base member 10 corresponds to one specific example of the "base member" and the "housing" of the technology. The stereolithographic object 40 corresponds to one specific example of the "stereolithographic object" of the technology. The surface of the base member 10 serves as a contact surface S with the stereolithographic object 40. The stereolithographic object 40 includes a base layer 41 provided in contact with the contact surface S, and the color layer 22 provided in contact with an upper surface of the base layer 41. The base layer 41 has a role as a base of the color layer 22, a role as a peeling layer that is used when the color layer 22 is peeled off from the base member 10, etc. The color layer 22 has a role as a decoration of the product 3. The base layer 41 may have the role as the decoration of the product 3. The base layer 41 corresponds to one specific example of the "base layer" of the technology. The color layer 22 corresponds to one specific example of the "color curable resin layer" of the technology.

The base layer 41 is configured by a first base layer 43 and a second base layer 44 that are stacked on each other. The first base layer 43 corresponds to one specific example of the "first base layer" of the technology. The second base layer 44 corresponds to one specific example of the "second base layer" of the technology. The first base layer 43 is provided at a position suitable for contact with the base member 10, and is provided in contact with the surface (the contact surface S) of the base member 10. The second base layer 44 is provided in contact with the first base layer 43 so that part of a side surface of the first base layer 43 is exposed. The second base layer 44 is provided in contact with an upper surface of the first base layer 43. Accordingly, in the product 3, the side surface of the first base layer 43 is exposed to outside.

The first base layer 43 is filled with a first curable resin part 43A and one or a plurality of second curable resin parts 43B. The first curable resin part 43A has a columnar shape that extends in a thickness direction from the contact surface S (a bottom surface of a stereolithographic object 50). The one or the plurality of second curable resin parts 43B each have a columnar shape that extends in the thickness direction from the contact surface S (the bottom surface of the stereolithographic object 50). The first curable resin part 43A is configured by a resin material that has a functional group number and a polymer polymerization degree that are relatively small compared with those of the second curable resin part 43B. The second curable resin part 43B is configured by a resin material that has a functional group number and a polymer polymerization degree that are relatively great compared with those of the first curable resin part 43A. Both the first curable resin part 43A and the second curable resin part 43B are provided at positions suitable for contact with the base member 10, and are provided in contact with the contact surface S. The second base layer 44 is filled with a third curable resin part 44A. The third curable resin part 44A is configured by a resin material that has a functional group number and a polymer polymerization degree that are relatively great compared with those of the first curable resin part 43A. The one or the plurality of second curable resin parts 43B and the third curable resin part 44A correspond to one specific example of the "second curable resin part" of the technology.

The first curable resin part 43A, the second curable resin part 43B, and the second base layer 44 are configured by members formed by curing ultraviolet curable resin. The ultraviolet curable resin (the foregoing resin a) used as a raw material of the first curable resin part 43A, the second curable resin part 43B, and the second base layer 44 is configured to include at least a polymerizable monomer and a photopolymerization initiator. The first curable resin part 43A, the second curable resin part 43B, and the second base layer 44 may be colorless and transparent, or may have a hue. In a case where the first curable resin part 43A, the second curable resin part 43B, and the second base layer 44 have the hues, a dye or a pigment is included as the additive of the resin α.

[Manufacturing Method]

Next, a description is given of a method of manufacturing the stereolithographic object 40.

FIG. 11A illustrates an example of a procedure of manufacturing the stereolithographic object 40. Any apparatus of the stereolithographic apparatus 100 and the stereolithographic apparatus 200 is used upon the manufacturing of the stereolithographic object 40. First, the resin (the resin B) that has high sensitivity in the band of 365 nm is applied to the surface of the base member 10 (step S501). The band of 365 nm corresponds to one specific example of the "first wavelength band" of the technology. The resin B corresponds to one specific example of the "first resin" of the technology. Next, the resin B is subjected to pulse irradiation with light in the sensitive wavelength band (the band of 365 nm) of the resin B (step S502). On this occasion, the resin B is irradiated with laser light or LED light from the light source unit 110. Thereby, a first base layer 43 including the first curable resin part 43A and the second curable resin part 43B is formed. The first curable resin part 43A has a functional group number and a polymer polymerization degree that are relatively small. The second curable resin part 43B has a functional group number and a polymer polymerization degree that are relatively great. The first curable resin part 43A corresponds to one specific example of the "first curable resin part" of the technology. The second curable resin part 43B corresponds to one specific example of the "second curable resin part" of the technology. The first base layer 43 corresponds to one specific example of the "first curable resin layer" of the technology.

Next, the resin (the resin A) that has high sensitivity in a wavelength band (the band of 405 nm) different from the sensitive wavelength band (the band of 365 nm) of the resin B is applied to an upper surface of the first base layer 43 (step S503). The band of 405 nm corresponds to one specific example of the "second wavelength band" of the technology. The resin A corresponds to one specific example of the "second resin" of the technology. Next, the entire resin A is irradiated with light in a wavelength band (that is, the sensitive wavelength band of the resin A (the band of 405 nm)) different from the sensitive wavelength band (the band of 365 nm) of the resin B (step S504). On this occasion, the entire resin A is irradiated with the laser light or the LED light from the light source unit 110 or the lamp light or the LED light from the light source unit 170. Thereby, the second base layer 44 is formed that has a functional group number and a polymer polymerization degree that are relatively great compared to those of the first base layer 43. Thus, the base layer 41 including the first base layer 43 and the second base layer 44 that are stacked on each other is formed. The second base layer 44 corresponds to one specific example of the "second curable resin layer" of the technology.

Next, the resin (the resin C) that has high sensitivity in a wavelength band (the band of 405 nm) different from the sensitive wavelength band (the band of 365 nm) of the resin B is applied to an upper surface of the base layer 41 (the second base layer 44) (step S505). Next, the entire resin C is irradiated with light in a wavelength band (that is, the sensitive wavelength band of the resin C (the band of 405 nm)) different from the sensitive wavelength band (the band of 365 nm) of the resin B (step S506). On this occasion, the entire resin C is irradiated with the laser light or the LED light from the light source unit 110 or the lamp light or the LED light from the light source unit 170, to thereby form the color layer 22. Thus, the stereolithographic object 40 is manufactured on the base member 10.

FIG. 11B illustrates an example of a procedure of manufacturing the stereolithographic object 40. Any apparatus of the stereolithographic apparatus 100 and the stereolithographic apparatus 200 is used upon the manufacturing of the stereolithographic object 40. First, the resin (the resin A) that has high sensitivity in the band of 405 nm is applied to the surface of the base member 10 (step S601). The band of 405 nm corresponds to one specific example of the "first wavelength band" of the technology. The resin A corresponds to one specific example of the "first resin" of the technology. Next, the resin A is subjected to pulse irradiation with light in the sensitive wavelength band (the band of 405 nm) of the resin A (step S602). On this occasion, the resin A is irradiated with laser light or LED light from the light source unit 110. Thereby, the first base layer 43 including the first curable resin part 43A and the second curable resin part 43B is formed. The first curable resin part 43A has a functional group number and a polymer polymerization degree that are relatively small. The second curable resin part 43B has a functional group number and a polymer polymerization degree that are relatively great. The first curable resin part 43A corresponds to one specific example of the "first curable resin part" of the technology. The second curable resin part 43B corresponds to one specific example of the "second curable resin part" of the technology. The first base layer 43 corresponds to one specific example of the "first curable resin layer" of the technology.

Next, the resin (the resin B) that has high sensitivity in a wavelength band (the band of 365 nm) different from the sensitive wavelength band (the band of 405 nm) of the resin A is applied to an upper surface of the first base layer 43 (step S603). The band of 365 nm corresponds to one specific example of the "second wavelength band" of the technology. The resin B corresponds to one specific example of the "second resin" of the technology. Next, the entire resin B is irradiated with light in a wavelength band (that is, the sensitive wavelength band of the resin B (the band of 365 nm)) different from the sensitive wavelength band (the band of 405 nm) of the resin A (step S604). On this occasion, the entire resin B is irradiated with the laser light or the LED light from the light source unit 110 or the lamp light or the LED light from the light source unit 170. Thereby, a second base layer 44 is formed that has a functional group number and a polymer polymerization degree that are relatively great compared to those of the first base layer 43. Thus, the base layer 41 including the first base layer 43 and the second base layer 44 that are stacked on each other is formed. The second base layer 44 corresponds to one specific example of the "second curable resin layer" of the technology.

Next, the resin (the resin D) that has high sensitivity in a wavelength band (the band of 365 nm) different from the sensitive wavelength band (the band of 405 nm) of the resin A is applied to an upper surface of the base layer 41 (the second base layer 44) (step S605). Next, the entire resin D is irradiated with light in a wavelength band (that is, the sensitive wavelength band of the resin D (the band of 365 nm)) different from the sensitive wavelength band (the band of 405 nm) of the resin A (step S606). On this occasion, the entire resin D is irradiated with the laser light or the LED light from the light source unit 110 or the lamp light or the LED light from the light source unit 170, to thereby form the color layer 22. Thus, the stereolithographic object 40 is manufactured on the base member 10.

[Effects]

Next, a description is given of effects of the method of manufacturing the stereolithographic object 40 according to the present embodiment.

In the present embodiment, there are formed two types of cured resin layers (the first curable resin part 43A and the second curable resin part 43B) that differ from each other in the functional group number and the polymer part by weight. The first curable resin part 43A is dissolved easily to a general remover compared with the second curable resin part 43B. In the present embodiment, the first curable resin part 43A that is dissolved easily to the general remover is formed in contact with the base member 10. Further, the side surface of the first curable resin part 43A is exposed to the outside. This makes it possible to easily dissolve the first curable resin part 43A by the general remover after the first base layer 43 including the first curable resin part 43A and the second curable resin part 43B, and the second base layer 44 are formed on the base member 10. As described above, the adhesion characteristics with respect to the base member 10 are decreased easily by the general remover in the present embodiment. As a result, it is possible to easily remove the stereolithographic object 40 by the general remover without using dedicated curable resin.

5. Fourth Embodiment

Next, a description is given of a product 4 according to a fourth embodiment of the technology.

[Configuration]

FIG. 12A illustrates an example of a cross-sectional configuration of the product 4 according to the fourth embodiment of the technology. FIG. 12B illustrates an example of a cross-sectional configuration taken along a line A-A in FIG. 12A. The product 4 includes the base member 10 and a stereolithographic object 50 that is provided in contact with the surface of the base member 10. The base member 10 corresponds to one specific example of the "base member" and the "housing" of the technology. The stereolithographic object 50 corresponds to one specific example of the "stereolithographic object" of the technology. The surface of the base member 10 serves as a contact surface S with the stereolithographic object 50. The stereolithographic object 50 includes a base layer 51 provided in contact with the contact surface S, and the color layer 22 provided in contact with an upper surface of the base layer 51. The base layer 51 has a role as a base of the color layer 22, a role as a peeling layer that is used when the color layer 22 is peeled off from the base member 10, etc. The color layer 22 has a role as a decoration of the product 4. The base layer 51 may have the role as the decoration of the product 4. The base layer 51 corresponds to one specific example of the "base layer" of the technology. The color layer 22 corresponds to one specific example of the "color curable resin layer" of the technology.

The base layer 51 is filled with a first curable resin part 51A and one or a plurality of second curable resin parts 51B. The first curable resin part 51A corresponds to one specific example of the "first curable resin part" of the technology. The second curable resin part 51B corresponds to one specific example of the "second curable resin part" of the technology. The first curable resin part 51A has a columnar shape that extends in a thickness direction from the contact surface S (a bottom surface of the stereolithographic object 50). The one or the plurality of second curable resin parts 51B each have a columnar shape that extends in the thickness direction from the contact surface S (the bottom surface of the stereolithographic object 50). The first curable resin part 51A is configured by a resin material that has a functional group number and a polymer polymerization degree that are relatively small compared with those of the second curable resin part 51B. The second curable resin part 51B is configured by a resin material that has a functional group number and a polymer polymerization degree that are relatively great compared with those of the first curable resin part 51A.

The first curable resin part 51A is provided at a position suitable for contact with the base member 10, and is provided in contact with the contact surface S. The second curable resin part 51B is provided in contact with the first curable resin part 51A so that part of a side surface of the first curable resin part 51A is exposed. The second curable resin part 51B is provided at a position suitable for contact with the base member 10, and is provided in contact with the contact surface S. Accordingly, in the product 4, the side surface of the first curable resin part 51A is exposed to the outside.

The first curable resin part 51A and the second curable resin part 51B are configured by members formed by curing ultraviolet curable resin. The ultraviolet curable resin (the foregoing resin a) used as a raw material of the first curable resin part 51A and the second curable resin part 51B is configured to include at least a polymerizable monomer and a photopolymerization initiator. The first curable resin part 51A and the second curable resin part 51B may be colorless and transparent, or may have a hue. In a case where the first curable resin part 51A and the second curable resin part 51B have the hues, a dye or a pigment is included as the additive of the resin α.

It is to be noted that, as illustrated in FIG. 13, the bottom part of the one or the plurality of second curable resin parts 51B may be arranged to be away from and separated from the contact surface S by a predetermined distance. In this case, the one or the plurality of second curable resin parts 51B each have an island-like shape or a columnar shape that extends in the thickness direction from a position away from the contact surface S (the bottom surface of the stereolithographic object 50).

[Manufacturing Method]

Next, a description is given of a method of manufacturing the stereolithographic object 50.

FIG. 14A illustrates an example of a procedure of manufacturing the stereolithographic object 50. Any apparatus of the stereolithographic apparatus 100 and the stereolithographic apparatus 200 is used upon the manufacturing of the stereolithographic object 50. First, the resin (the resin B) that has high sensitivity in the band of 365 nm is applied to the surface of the base member 10 (step S701). The band of 365 nm corresponds to one specific example of the "first wavelength band" of the technology. The resin B corresponds to one specific example of the "first resin" of the technology. Next, the entire resin B is irradiated with light in a wavelength band (the band of 405 nm) different from the sensitive wavelength band (the band of 365 nm) of the resin B (step S702). On this occasion, the entire resin B is irradiated with laser light or LED light from the light source unit 110, or lamp light or LED light from the light source unit 170. Thereby, a first cured resin layer 51C is formed that has a functional group number and a polymer polymerization degree that are relatively small. The first cured resin layer 51C corresponds to one specific example of the "curable resin layer" of the technology. The first curable resin layer 51C is configured by a material same as that of the first curable resin part 51A.

Next, the first cured resin layer 51C is subjected to pulse irradiation with light in the sensitive wavelength band (the band of 365 nm) of the first cured resin layer 51C (step S703). On this occasion, the first cured resin layer 51C is irradiated with the laser light or the LED light from the light source unit 110. Thereby, a plurality of columnar parts are changed into the plurality of second curable resin parts 51B that each have a functional group number and a polymer polymerization degree that are relatively great compared with those of the first curable resin layer 51C before the irradiation. The plurality of columnar parts are part, of the first curable resin layer 51C, excluding part of a side surface of the first curable resin layer 51C and extending from the surface of the base member 10 or a position away from the surface of the base member 10 to an uppermost surface of the first curable resin layer 51C. As a result, the rest of the first curable resin layer 51C becomes the first curable resin part 51A. Thus, the base layer 51 including the first curable resin part 51A and the plurality of second curable resin parts 51B is formed.

Next, the resin (the resin C) that has high sensitivity in a wavelength band (the band of 405 nm) different from the sensitive wavelength band (the band of 365 nm) of the resin B is applied to an upper surface of the base layer 51 (step S704). Next, the entire resin C is irradiated with light in a wavelength band (that is, the sensitive wavelength band of the resin C (the band of 405 nm)) different from the sensitive wavelength band (the band of 365 nm) of the resin B (step S705). On this occasion, the entire resin C is irradiated with the laser light or the LED light from the light source unit 110 or the lamp light or the LED light from the light source unit 170, to thereby form the color layer 22. Thus, the stereolithographic object 50 is manufactured on the base member 10.

FIG. 14B illustrates an example of a procedure of manufacturing the stereolithographic object 50. Any apparatus of the stereolithographic apparatus 100 and the stereolithographic apparatus 200 is used upon the manufacturing of the stereolithographic object 50. First, the resin (the resin A) that has high sensitivity in the band of 405 nm is applied to the surface of the base member 10 (step S801). The band of 405 nm corresponds to one specific example of the "first wavelength band" of the technology. The resin A corresponds to one specific example of the "first resin" of the technology. Next, the entire resin A is irradiated with light in a wavelength band (the band of 365 nm) different from the sensitive wavelength band (the band of 405 nm) of the resin A (step S802). On this occasion, the entire resin A is irradiated with laser light or LED light from the light source unit 110, or lamp light or LED light from the light source unit 170. Thereby, the first cured resin layer 51C is formed that has a functional group number and a polymer polymerization degree that are relatively small. The cured resin layer 51C corresponds to one specific example of the "curable resin layer" of the technology. The first curable resin layer 51C is configured by a material same as that of the first curable resin part 51A.

Next, the first cured resin layer 51C is subjected to pulse irradiation with light in the sensitive wavelength band (the band of 405 nm) of the first cured resin layer 51C (step S803). On this occasion, the first cured resin layer 51C is irradiated with the laser light or the LED light from the light source unit 110. Thereby, a plurality of columnar parts are changed into the plurality of second curable resin parts 51B that each have a functional group number and a polymer polymerization degree that are relatively great compared with those of the first curable resin layer 51C before the irradiation. The plurality of columnar parts are part, of the first curable resin layer 51C, excluding part of a side surface of the first curable resin layer 51C and extending from the surface of the base member 10 or a position away from the surface of the base member 10 to an uppermost surface of the first curable resin layer 51C. As a result, the rest of the first curable resin layer 51C becomes the first curable resin part 51A. Thus, the base layer 51 including the first curable resin part 51A and the plurality of second curable resin parts 51B is formed.

Next, the resin (the resin D) that has high sensitivity in a wavelength band (the band of 365 nm) different from the sensitive wavelength band (the band of 405 nm) of the resin A is applied to an upper surface of the base layer 51 (step S804). Next, the entire resin D is irradiated with light in a wavelength band (that is, the sensitive wavelength band of the resin D (the band of 365 nm)) different from the sensitive wavelength band (the band of 405 nm) of the resin A (step S805). On this occasion, the entire resin D is irradiated with the laser light or the LED light from the light source unit 110 or the lamp light or the LED light from the light source unit 170, to thereby form the color layer 22. Thus, the stereolithographic object 50 is manufactured on the base member 10.

[Effects]

Next, a description is given of effects of the method of manufacturing the stereolithographic object 50 according to the present embodiment.

In the present embodiment, there are formed two types of cured resin layers (the first curable resin part 51A and the second curable resin part 51B) that differ from each other in the functional group number and the polymer part by weight. The first curable resin part 51A is dissolved easily to a general remover compared with the second curable resin part 51B. In the present embodiment, the first curable resin part 51A that is dissolved easily to the general remover is formed in contact with the base member 10. Further, the side surface of the first curable resin part 51A is exposed to the outside. This makes it possible to easily dissolve the first curable resin part 51A to the general remover after the base layer 51 including the first curable resin part 51A and the second curable resin part 51B is formed on the base member 10. As described above, the adhesion characteristics with respect to the base member 10 are decreased easily by the general remover in the present embodiment. As a result, it is possible to easily remove the stereolithographic object 50 by the general remover without using dedicated curable resin.

6. Fifth Embodiment

Next, a description is given of a product 5 according to a fifth embodiment of the technology.

[Configuration]

FIG. 15 illustrates an example of a cross-sectional configuration of the product 5 according to the fifth embodiment of the technology. The product 5 includes the base member 10 and a stereolithographic object 60 that is provided in contact with the surface of the base member 10. The base member 10 corresponds to one specific example of the "base member" and the "housing" of the technology. The stereolithographic object 60 corresponds to one specific example of the "stereolithographic object" of the technology. The surface of the base member 10 serves as a contact surface S with the stereolithographic object 60. The stereolithographic object 60 includes a base layer 61 provided in contact with the contact surface S, and the color layer 22 provided in contact with an upper surface of the base layer 61. The base layer 61 has a role as a base of the color layer 22, a role as a peeling layer that is used when the color layer 22 is peeled off from the base member 10, etc. The color layer 22 has a role as a decoration of the product 5. The base layer 61 may have the role as the decoration of the product 5. The base layer 61 corresponds to one specific example of a "plurality of curable resin parts" of the technology. The color layer 22 corresponds to one specific example of the "color curable resin layer" of the technology.

The base layer 61 includes a plurality of curable resin parts 61A and a void 61B provided in a layer including the plurality of curable resin parts 61A. Accordingly, in the product 5, each of the curable resin parts 61A is in communication with the outside via the void 61B. The plurality of curable resin parts 61A are each provided at a position suitable for contact with the base member 10, and are provided in contact with the contact surface S. The plurality of curable resin parts 61A each have an island-like shape or a columnar shape that extends in the thickness direction from the contact surface S (the bottom surface of the stereolithographic object 50). The color layer 22 is provided in contact with the plurality of curable resin parts 61A in a state where the void 61B is provided in a gap of the plurality of curable resin parts 61A. The curable resin part 61A corresponds to one specific example of the "curable resin part" of the technology. The void 61B corresponds to one specific example of a "void" of the technology. The color layer 22 corresponds to one specific example of the "color curable resin layer" of the technology.

The plurality of curable resin parts 61A are configured by members formed by curing ultraviolet curable resin. The ultraviolet curable resin (the foregoing resin a) used as a raw material of the plurality of curable resin parts 61A is configured to include at least a polymerizable monomer and a photopolymerization initiator. The plurality of curable resin parts 61A may be colorless and transparent, or may have a hue. In a case where the plurality of curable resin parts 61A have the hues, a dye or a pigment is included as the additive of the resin α. In this case, the resin α corresponds to one specific example of a "color curable resin material" of the technology.

[Manufacturing Method]

Next, a description is given of a method of manufacturing the stereolithographic object 60.

FIG. 16 illustrates an example of a procedure of manufacturing the stereolithographic object 60. Any apparatus of the stereolithographic apparatus 100 and the stereolithographic apparatus 200 is used upon the manufacturing of the stereolithographic object 60. First, the resin (the resin A) that has high sensitivity in the band of 405 nm or the resin (the resin B) that has high sensitivity in the band of 365 nm is applied to the surface of the base member 10 (step S901). The resin A or the resin B corresponds to one specific example of the "first resin" of the technology. Next, in a case where the resin A is applied to the surface of the base member 10, irradiation with light in the sensitive wavelength band (the band of 405 nm) of the resin A is performed, and in a case where the resin B is applied to the surface of the base member 10, irradiation with light in the sensitive wavelength band (the band of 365 nm) of the resin B is performed (step S902). On this occasion, the irradiation is performed with laser light or LED light from the light source unit 110. Thereby, the plurality of curable resin parts 61A are formed. Thereafter, an uncured part of the resin A or the resin B on the surface of the base member 10 is removed (step S903). Thus, the plurality of island-shaped or columnar curable resin parts 61A are formed. The curable resin part 61A corresponds to one specific example of the "curable resin part" of the technology.

Next, the resin C or the resin D is applied to a surface including the plurality of curable resin parts 61A (step S904). Next, in a case where the resin C is applied, the entire resin C is irradiated with light in the sensitive wavelength band (the band of 405 nm) of the resin C (step S905). In a case where the resin D is applied, the entire resin D is irradiated with light in the sensitive wavelength band (the band of 365 nm) of the resin D (step S905). On this occasion, the entire resin D is irradiated with the laser light or the LED light from the light source unit 110 or the lamp light or the LED light from the light source unit 170 to thereby form the color layer 22. On this occasion, the color layer 22 is formed that is in contact with the plurality of curable resin parts 61A in the state where the void 61B is provided in the gap of the plurality of curable resin parts 61A. Thus, the stereolithographic object 60 is manufactured on the base member 10.

[Effects]

Next, a description is given of effects of the method of manufacturing the stereolithographic object 60 according to the present embodiment.

In the present embodiment, the void 61B is provided between the base member 10 and the color layer 22 by forming the plurality of curable resin parts 61A on the base member 10. Accordingly, the void 61B provided in the gap of the plurality of curable resin parts 61A becomes a path through which the remover passes through. This makes it possible to easily dissolve the plurality of curable resin parts 61A by the general remover. Moreover, in the present embodiment, the area in which the color layer 22 is in contact with the base member 10 is small compared with that in a case where the void 61B is not provided between the base member 10 and the color layer 22. In the present embodiment, it is possible, in the first place, that the color layer 22 is not in contact with the base member 10. As described above, the adhesion characteristics with respect to the base member 10 are decreased easily by the general remover in the present embodiment. As a result, it is possible to easily remove the stereolithographic object 60 by the general remover without using dedicated curable resin.

7. Sixth Embodiment

Next, a description is given of a product 6 according to a sixth embodiment of the technology.

[Configuration]

FIG. 17 illustrates an example of a cross-sectional configuration of the product 6 according to the sixth embodiment of the technology. The product 6 includes the base member 10 and a stereolithographic object 70 that is provided in contact with the surface of the base member 10. The base member 10 corresponds to one specific example of the "base member" and the "housing" of the technology. The stereolithographic object 70 corresponds to one specific example of the "stereolithographic object" of the technology. The surface of the base member 10 serves as a contact surface S with the stereolithographic object 70. The stereolithographic object 70 includes a base layer 71 provided in contact with the contact surface S, and a color layer 72 provided in contact with an upper surface of the base layer 71. The base layer 71 has a role as a base of the color layer 72, a role as a peeling layer that is used when the color layer 72 is peeled off from the base member 10, etc. The color layer 72 has a role as a decoration of the product 6. The base layer 71 may have the role as the decoration of the product 6. The base layer 71 corresponds to one specific example of the "first curable resin part" of the technology. The color layer 72 corresponds to one specific example of "one or a plurality of second curable resin parts" and "one or a plurality of color curable resin parts" of the technology.

The base layer 71 is filled with a curable resin part 71A that has a functional group number and a polymer polymerization degree that are relatively small compared with those of the color layer 72. The color layer 72 is filled with a color curable resin part 72A that has a functional group number and a polymer polymerization degree that are relatively great compared with those of the curable resin part 71A. In other words, the stereolithographic object 70 includes the curable resin part 71A and the color curable resin part 72A that are stacked on each other. It is to be noted that the color layer 72 may be configured by a plurality of island-shaped color curable resin parts 72A, for example. The curable resin part 71A corresponds to one specific example of the "first curable resin part" of the technology. The one or the plurality of color curable resin parts 72A correspond to one specific example of the "one or the plurality of second curable resin parts" and the "one or the plurality of color curable resin parts" of the technology.

The curable resin part 71A is configured by a member formed by curing ultraviolet curable resin. The ultraviolet curable resin (the foregoing resin a) used as a raw material of the curable resin part 71A is configured to include at least a polymerizable monomer and a photopolymerization initiator. The curable resin part 71A may be colorless and transparent, or may have a hue. In a case where the curable resin part 71A has the hue, a dye or a pigment is included as the additive of the resin α.

The color curable resin part 72A is configured by a member formed by curing ultraviolet curable resin. Ultraviolet curable resin (resin γ) used as a raw material of the color curable resion part 72A is configured to include at least a polymerizable monomer and a photopolymerization initiator. The resin γ is configured to include the polymerizable monomer, a polymerizable oligomer, the photopolymerization initiator, a sensitizer, and an additive, for example. The resin γ is radical-polymerization-type resin, for example. The polymerizable monomer included in the resin γ is an acrylate monomer, for example. The polymerizable oligomer included in the resin γ is urethane acrylate, polyester acrylate, epoxy acrylate, or acryl acrylate, for example. The photopolymerization initiator included in the resin γ is a benzophenone-based initiator, an acetophenone-based initiator, or a thioxanthone-based initiator, for example. The sensitizer included in the resin γ is tertiary amine, for example. The additive includable in the resin γ is a polymerization inhibiter, various fillers (filling materials), a leveling agent, a fluidity adjuster, an antifoamer, or a plasticizer, for example. The color layer 72 corresponds to a main part of the decoration of the shaped object 500. Accordingly, the color layer 72 has a hue for the decoration of the shaped object 500, and includes a dye or a pigment as the additive.

[Manufacturing Method]

Next, a description is given of a method of manufacturing the stereolithographic object 70.

FIG. 18 illustrates an example of a procedure of manufacturing the stereolithographic object 70. Any apparatus of the stereolithographic apparatus 100, the stereolithographic apparatus 200, and the stereolithographic apparatus 300 is used upon the manufacturing of the stereolithographic object 70. First, the resin (the resin B) that has high sensitivity in the band of 365 nm is applied to the surface of the base member 10 (step S1001). The band of 365 nm corresponds to one specific example of the "first wavelength band" of the technology. The resin B corresponds to one specific example of the "first resin" of the technology. Next, the entire resin B is irradiated with light in a wavelength band (the band of 405 nm) different from the sensitive wavelength band (the band of 365 nm) of the resin B (step S1002). On this occasion, the entire resin B is irradiated with laser light or LED light from the light source unit 110 or lamp light or LED light from the light source unit 170. Thereby, the curable resin part 71A is formed that has a functional group number and a polymer polymerization degree that are relatively small. The curable resin part 71A corresponds to one specific example of the "first curable resin layer" of the technology.

Next, the resin (the resin D) that has high sensitivity in a wavelength band (the band of 405 nm) different from the sensitive wavelength band (the band of 365 nm) of the resin B is applied to an upper surface of the curable resin part 71A (step S1003). The band of 405 nm corresponds to one specific example of the "second wavelength band" of the technology. The resin D is the ultraviolet curable resin to be used as the raw material of the color layer 72, and corresponds to one specific example of the "second resin" of the technology. On this occasion, it is preferable that resin that has high sensitivity in a wavelength band (the band of 405 nm) that is different from the sensitive wavelength band (the band of 365 nm) of the resin B and is higher than the sensitive wavelength band (the band of 365 nm) of the resin B is selected as the resin D. A reason for this is that, by selecting a wavelength (a long wavelength) with low energy that passes through the resin D but has difficulty in reaching the curable resin part 71A as the light to be used to cure the resin D, it is possible to easily control the curing of the curable resin part 71A not to proceed excessively by the light to be used to cure the resin D.

Next, the entire resin D is irradiated with light in a wavelength band (that is, the sensitive wavelength band of the resin A (the band of 405 nm)) different from the sensitive wavelength band (the band of 365 nm) of the resin B (step S1004). On this occasion, it is preferable that the entire resin D is irradiated with light in a wavelength band (the band of 405 nm) higher than the sensitive wavelength band (the band of 365 nm) of the resin B. Further, on this occasion, the entire resin D is irradiated with the laser light or the LED light from the light source unit 110 or the lamp light or the LED light from the light source unit 170. Thereby, the color layer 72 is formed that has a functional group number and a polymer polymerization degree that are relatively great compared with those of the curable resin part 71A. The color layer 72 corresponds to one specific example of the "second curable resin layer" of the technology. Thus, the stereolithographic object 70 is manufactured on the base member 10.

[Effects]

Next, a description is given of effects of the method of manufacturing the stereolithographic object 70 according to the present embodiment.

In the present embodiment, there are formed two types of cured resin layers (the base layer 71 and the color layer 72) that differ from each other in the functional group number and the polymer part by weight. The base layer 71 is dissolved easily to a general remover compared with the color layer 72. In the present embodiment, the base layer 71 that is dissolved easily to the general remover is formed in contact with the base member 10. Further, the side surface of the base layer 71 is exposed to the outside. This makes it possible to easily dissolve the base layer 71 by the general remover after the base layer 71 and the color layer 72 are formed on the base member 10. As described above, the adhesion characteristics with respect to the base member 10 are decreased easily by the general remover in the present embodiment. As a result, it is possible to easily remove the stereolithographic object 70 by the general remover without using dedicated curable resin.

The technology has been described above with reference to the embodiments and the modification examples thereof; however, the technology is not limited to the foregoing embodiments, etc., and is modifiable in various ways.

Moreover, for example, the technology is able to have the following configurations.

(1)

A stereolithographic object including:

a first curable resin part that is provided at a position suitable for contact with a base member, and has a functional group number and a polymer polymerization degree that are relatively small; and one or a plurality of second curable resin parts that are provided to be in contact with the first curable resin part and to allow part of a side surface of the first curable resin part to be exposed, the one or the plurality of second curable resin parts each having a functional group number and a polymer polymerization degree that are relatively great compared with those of the first curable resin part.

(2)

The stereolithographic object according to (1), in which the one or the plurality of second curable resin parts are each also provided at a position suitable for contact with the base member.

(3)

The stereolithographic object according to (1), including a base layer including a first base layer and a second base layer that are stacked on each other, in which the first base layer is filled with the first curable resin part, and the second base layer is filled with the second curable resin parts.

(4)

The stereolithographic object according to (2), including a base layer including a first base layer and a second base layer that are stacked on each other, in which the first base layer is filled with part of the first curable resin part and the one or the plurality of the second curable resin parts, and the second base layer is filled with part of the second curable resin parts.

(5)

The stereolithographic object according to (2), including a base layer that is filled with the first curable resin part having a columnar shape that extends from a bottom surface of the stereolithographic object in a thickness direction and the one or the plurality of second curable resin parts each having a columnar shape that extends from the bottom surface of the stereolithographic object in the thickness direction.

(6)

The stereolithographic object according to (1), including a base layer that is filled with the first curable resin part having a columnar shape that extends from a bottom surface of the stereolithographic object in a thickness direction and the one or the plurality of second curable resin parts each having a columnar shape that extends from a position away from the bottom surface of the stereolithographic object in the thickness direction.

(7)

The stereolithographic object according to any one of (1) to (6), including a color curable resin layer that is in contact with an upper surface of the base layer.

(8)

The stereolithographic object according to (1), in which the one or the plurality of second curable resin parts comprises one or a plurality of color curable resin parts, and the first curable resin part is provided between the one or the plurality of second curable resin parts and the base member.

(9)

A stereolithographic object including:

a plurality of curable resin parts that are each provided at a position suitable for contact with a base member; and a color curable resin layer that is provided in contact with the plurality of curable resin parts in a state in which a void is provided in a gap of the plurality of curable resin parts.

(10)

The stereolithographic object according to (9), in which the plurality of curable resin parts are configured by a color curable resin material.

(11)

A product including:

a housing;

a first curable resin part that is provided in contact with a surface of the housing, and has a functional group number and a polymer polymerization degree that are relatively small; and one or a plurality of second curable resin parts that are provided to be in contact with the first curable resin part and to allow part of a side surface of the first curable resin part to be exposed, the one or the plurality of second curable resin parts each having a functional group number and a polymer polymerization degree that are relatively great compared with those of the first curable resin part.

(12)

A product including:

a housing;

a plurality of curable resin parts that are provided in contact with a surface of the housing; and a color curable resin layer that is provided in contact with the plurality of curable resin parts in a state in which a void is provided in a gap of the plurality of curable resin parts.

(13)

A method of manufacturing a stereolithographic object, the method including:

applying, to a surface of a base member, first resin that has high sensitivity in a first wavelength band;

forming a first curable resin layer by irradiating the entire first resin with light in a wavelength band different from the first wavelength band, the first curable resin layer having a functional group number and a polymer polymerization degree that are relatively small; and changing an upper part of the first curable resin layer into a second curable resin layer by irradiating the entire first curable resin layer with light in the first wavelength band, the second curable resin layer having a functional group number and a polymer polymerization degree that are relatively great compared with those of a lower part of the first curable resin layer.

(14)

A method of manufacturing a stereolithographic object, the method including:

applying, to a surface of a base member, first resin that has high sensitivity in a first wavelength band;

forming a first curable resin layer by irradiating the entire first resin with light in a wavelength band different from the first wavelength band, the first curable resin layer having a functional group number and a polymer polymerization degree that are relatively small;

applying, to an upper surface of the first curable resin layer, second resin that has high sensitivity in a second wavelength band, the second wavelength band being different from the first wavelength band; and forming a second curable resin layer by irradiating the entire second resin layer with light in the second wavelength band, the second curable resin layer having a functional group number and a polymer polymerization degree that are relatively great compared with those of the first curable resin layer.

(15)

A method of manufacturing a stereolithographic object, the method including:

applying, to a surface of a base member, first resin that has high sensitivity in a first wavelength band;

forming a first curable resin layer by performing, on the first resin, pulse irradiation with laser light in the first wavelength band, the first curable resin layer including a first curable resin part and one or a plurality of second curable resin parts, the first curable resin part having a functional group number and a polymer polymerization degree that are relatively small, the one or the plurality of second curable resin parts being in contact with the first curable resin part and allowing part of a side surface of the first curable resin part to be exposed, the one or the plurality of second curable resin parts each having a functional group number and a polymer polymerization degree that are relatively great compared with those of the first curable resin part;

applying, to an upper surface of the first curable resin layer, second resin that has high sensitivity in a second wavelength band, the second wavelength band being different from the first wavelength band; and forming a second curable resin layer, by irradiating the entire second resin with light in the second wavelength band, the second curable resin layer having a functional group number and a polymer polymerization degree that are relatively great compared with those of the first curable resin layer.

(16)

A method of manufacturing a stereolithographic object, the method including:

applying, to a surface of a base member, first resin that has high sensitivity in a first wavelength band;

forming a curable resin layer by irradiating the entire first resin with light in a wavelength band different from the first wavelength band, the curable resin layer having a functional group number and a polymer polymerization degree that are relatively small; and changing a plurality of columnar parts of the curable resin layer into a plurality of curable resin parts by performing, on the curable resin layer, pulse irradiation with laser light in the first wavelength band, the plurality of columnar parts being a part, of the curable resin layer, excluding part of a side surface of the curable resin layer and extending from a surface of the base member or a position away from the surface of the base member to an uppermost surface of the curable resin layer, the plurality of curable resin parts each having a functional group number and a polymer polymerization degree that are relatively great compared to those of the curable resin layer before the irradiation.

(17)

A method of manufacturing a stereolithographic object, the method including:

applying, to a surface of a base member, first resin that has high sensitivity in a predetermined wavelength band;

forming a plurality of island-shaped or columnar curable resin parts by performing, on the first resin, pulse irradiation with laser light in a wavelength band; and forming a color curable resin layer that is in contact with the plurality of curable resin parts in a state in which a void is provided in a gap of the plurality of curable resin parts.

This application is based upon and claims the benefit of priority of the Japanese Patent Application No. 2015-099922 filed with the Japan Patent Office on May 15, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A stereolithographic object, comprising:
a base layer that comprises a first curable resin part and at least one second curable resin part; and
a color curable resin layer on the base layer, wherein
the first curable resin part is at a position suitable for contact with a base member,
the first curable resin part has a first functional group number and a first polymer polymerization degree,
the at least one second curable resin part in contact with the first curable resin part,
a part of a side surface of the first curable resin part is exposed, and
the at least one second curable resin part has a second functional group number larger than the first functional group number and a second polymer polymerization degree larger than the first polymer polymerization degree.

2. The stereolithographic object according to claim 1, wherein the at least one second curable resin part is at a position suitable for contact with the base member.

3. The stereolithographic object according to claim 1, wherein
the base layer includes a first base layer and a second base layer that are stacked on each other,
the first base layer is filled with the first curable resin part, and
the second base layer is filled with the at least one second curable resin part.

4. The stereolithographic object according to claim 2, wherein
the base layer includes a first base layer and a second base layer that are stacked on each other,
the first base layer is filled with the first curable resin part and the at least one second curable resin part, and
the second base layer is filled with the at least one second curable resin part.

5. The stereolithographic object according to claim 2, wherein
the base layer is filled with the first curable resin part having a columnar shape that extends from a bottom surface of the stereolithographic object in a thickness direction and the at least one second curable resin part having a columnar shape that extends from the bottom surface of the stereolithographic object in the thickness direction.

6. The stereolithographic object according to claim 1, wherein
the base layer is filled with the first curable resin part having a columnar shape that extends from a bottom surface of the stereolithographic object in a thickness direction and the at least one second curable resin part having a columnar shape that extends from a position away from the bottom surface of the stereolithographic object in the thickness direction.

7. The stereolithographic object according to claim 1, wherein the color curable resin layer is in contact with an upper surface of the base layer.

* * * * *